United States Patent
Champy

(10) Patent No.: US 11,727,441 B2
(45) Date of Patent: *Aug. 15, 2023

(54) METHODS, SYSTEMS AND MEDIA FOR PRESENTING MEDIA CONTENT THAT WAS ADVERTISED ON A SECOND SCREEN DEVICE USING A PRIMARY DEVICE

(71) Applicant: Google LLC, Mountain View, CA (US)

(72) Inventor: Adam Champy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/460,871

(22) Filed: Aug. 30, 2021

(65) Prior Publication Data

US 2021/0390580 A1 Dec. 16, 2021

Related U.S. Application Data

(63) Continuation of application No. 14/879,974, filed on Oct. 9, 2015, now Pat. No. 11,107,126, which is a
(Continued)

(51) Int. Cl.
*G06Q 30/0251* (2023.01)
*H04N 21/431* (2011.01)
(Continued)

(52) U.S. Cl.
CPC ..... *G06Q 30/0257* (2013.01); *G06Q 30/0241* (2013.01); *G06Q 30/0251* (2013.01);
(Continued)

(58) Field of Classification Search
USPC ....................................................... 705/14.53
See application file for complete search history.

(56) References Cited

U.S. PATENT DOCUMENTS 8,234,672 B2 * 7/2012 Morse .................... G08C 17/02
725/74
8,819,726 B2 8/2014 Wetzer et al.
(Continued)

FOREIGN PATENT DOCUMENTS

CN 104135688 11/2014
WO WO 2013112473 8/2013
(Continued)

OTHER PUBLICATIONS

TV-Anytime based personalized bi-directional metadata service system ; 2006 IEE (Year: 2006).*
(Continued)

*Primary Examiner* — Victoria E. Frunzi
(74) *Attorney, Agent, or Firm* — Kilpatrick Townsend & Stockton LLP

(57) ABSTRACT

Methods, systems and media for presenting media content that was advertised on a second screen device using a primary screen device are provided. In some implementations, a method for advertising media content to a user is provided, the method comprising: receiving an advertisement request from a computing device; receiving association information indicating that the computing device is associated with a media presentation device; receiving user account information associated with the user account; in response to the advertisement request, selecting an advertisement for media content based at least in part on the association information and the user account information; determining whether an indicator of subscription status of the user account to a service is to be presented in connection with the selected advertisement; causing the advertisement to be presented by computing device, wherein the advertisement is associated with instructions that, in response to interaction with the advertisement, cause the computing device to instruct the media presentation device to present
(Continued)

the media content and the indicator of subscription status; receiving input indicating that the indicator of subscription status has been selected; causing an application associated with the service to be transmitted to the computing device; and updating the subscription status of the user account in connection with the service.

21 Claims, 23 Drawing Sheets

Related U.S. Application Data continuation-in-part of application No. 14/600,420, filed on Jan. 20, 2015, now abandoned.

(51) Int. Cl.
*G06Q 30/0241* (2023.01)
*H04N 21/414* (2011.01)
*H04N 21/858* (2011.01)
*H04N 21/4725* (2011.01)
*H04N 21/41* (2011.01)
*H04N 21/4782* (2011.01)
*G06Q 30/0207* (2023.01)

(52) U.S. Cl.
CPC ..... *G06Q 30/0255* (2013.01); *G06Q 30/0267* (2013.01); *G06Q 30/0277* (2013.01); *H04N 21/4122* (2013.01); *H04N 21/41407* (2013.01); *H04N 21/4316* (2013.01); *H04N 21/4725* (2013.01); *H04N 21/8586* (2013.01); *G06Q 30/0225* (2013.01); *H04N 21/4782* (2013.01)

(56) References Cited

U.S. PATENT DOCUMENTS

| | | | |
|---|---|---|---|
| 9,173,005 B1* | 10/2015 | Redford | H04L 65/1094 |
| 2006/0127037 A1* | 6/2006 | Van Hoff | H04N 5/85 |
| | | | 386/250 |
| 2010/0280903 A1 | 11/2010 | Barlin et al. | |
| 2012/0108230 A1* | 5/2012 | Stepanian | H04N 21/4147 |
| | | | 455/422.1 |
| 2012/0323674 A1 | 12/2012 | Simmons et al. | |
| 2013/0055323 A1 | 2/2013 | Venkitaraman et al. | |
| 2013/0198642 A1 | 8/2013 | Carney et al. | |
| 2013/0290711 A1 | 10/2013 | Rajkumar et al. | |
| 2013/0347018 A1 | 12/2013 | Limp et al. | |
| 2014/0006947 A1 | 1/2014 | Garmark et al. | |
| 2014/0149228 A1 | 5/2014 | Erickson et al. | |
| 2014/0189732 A1 | 7/2014 | Shkedi et al. | |
| 2014/0222579 A1 | 8/2014 | Kobori et al. | |
| 2014/0223476 A1 | 8/2014 | Shkedi | |
| 2014/0362293 A1 | 12/2014 | Bakar et al. | |
| 2015/0095143 A1* | 4/2015 | Jin | G06Q 30/0251 |
| | | | 705/14.49 |
| 2015/0095160 A1 | 4/2015 | Ma | |
| 2016/0098765 A1 | 4/2016 | Ishida et al. | |
| 2017/0094332 A1* | 3/2017 | Thomas | H04N 21/4532 |

FOREIGN PATENT DOCUMENTS

| | | |
|---|---|---|
| WO | WO 2014192690 | 12/2014 |
| WO | WO 2014197850 | 12/2014 |

OTHER PUBLICATIONS

Decision to Refuse a European Patent Application dated Sep. 14, 2020 in EP Patent Application No. 16784683.1.
Examination Report dated Feb. 15, 2019 in EP Patent Application No. 16784683.1.
Examination Report dated Nov. 26, 2020 in EP Patent Application No. 16702601.2.
Han, Le, "LeTV of 'Ecologism'", in 21st Century Business, Jul. 31, 2015, pp. 64-65.
International Search Report & Written Opinion dated Apr. 22, 2016 in International Patent Application No. PCT/2016/012205.
International Search Report and Written Opinion dated Jan. 24, 2017 in International Patent Application No. PCT/US2016/056137.
Notice of Allowance dated Apr. 28, 2021 in U.S. Appl. No. 14/879,974.
Office Action dated Jan. 21, 2020 in CN Patent Application No. 201680014881.X.
Office Action dated Jan. 24, 2018 in U.S. Appl. No. 14/600,420.
Office Action dated Feb. 5, 2018 in U.S. Appl. No. 14/879,974.
Office Action dated Apr. 16, 2019 in U.S. Appl. No. 14/879,974.
Office Action dated Apr. 22, 2021 in CN Patent Application 201680041528.0.
Office Action dated May 31, 2018 in U.S. Appl. No. 14/600,420.
Office Action dated Jun. 11, 2018 in U.S. Appl. No. 14/879,974.
Office Action dated Jul. 9, 2020 in CN Patent Application No. 201680014881.X.
Office Action dated Aug. 16, 2017 in U.S. Appl. No. 14/600,420.
Office Action dated Nov. 13, 2018 in U.S. Appl. No. 14/600,420.
Office Action dated Nov. 19, 2020 in U.S. Appl. No. 14/600,420.
Office Action dated Dec. 11, 2018 in U.S. Appl. No. 14/879,974.
Roettgers, J., "Chromecast's Secret Weapon to Take Over Your TV", last updated Jul. 24, 2013, pp. 1-6, available at: http://gigaom.com/author/jroettgers/.
Summons to Attend Oral Proceedings dated Jan. 7, 2020 in EP Patent Application No. 16784683.1.
Yoon et al., "TV-Anytime Based Personalized Bi-Directional Metadata Service System", In Proceedings of IEEE Symposium on Consumer Electronics, Jul. 2006, pp. 1-6.

* cited by examiner

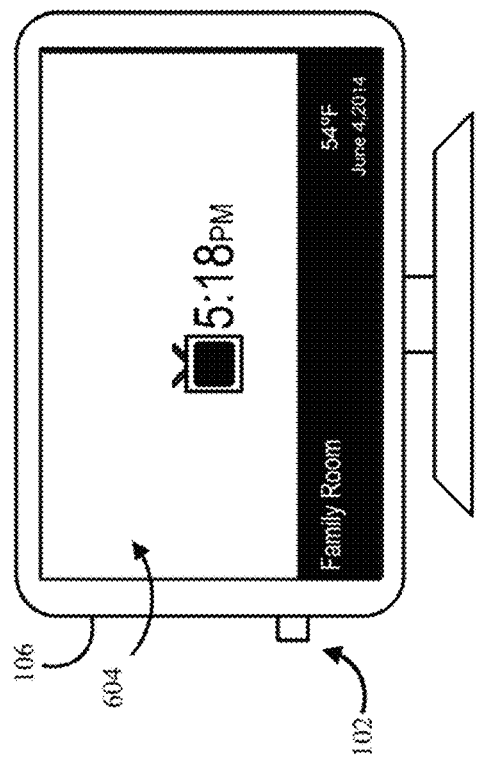
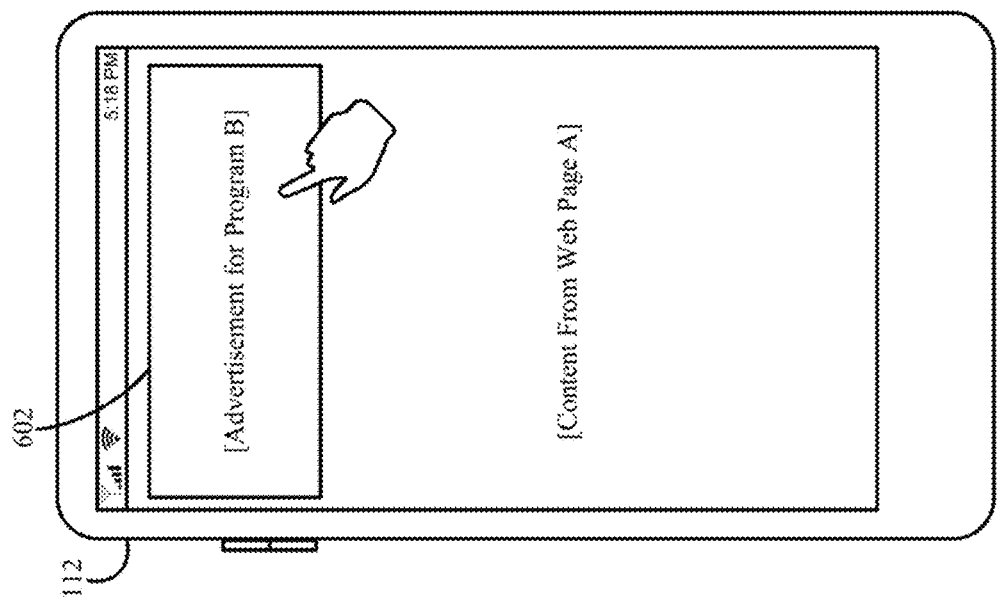
FIG. 6

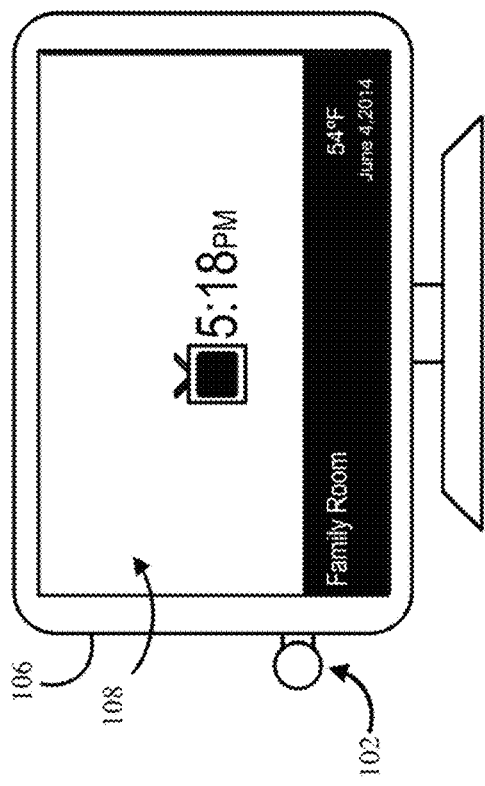
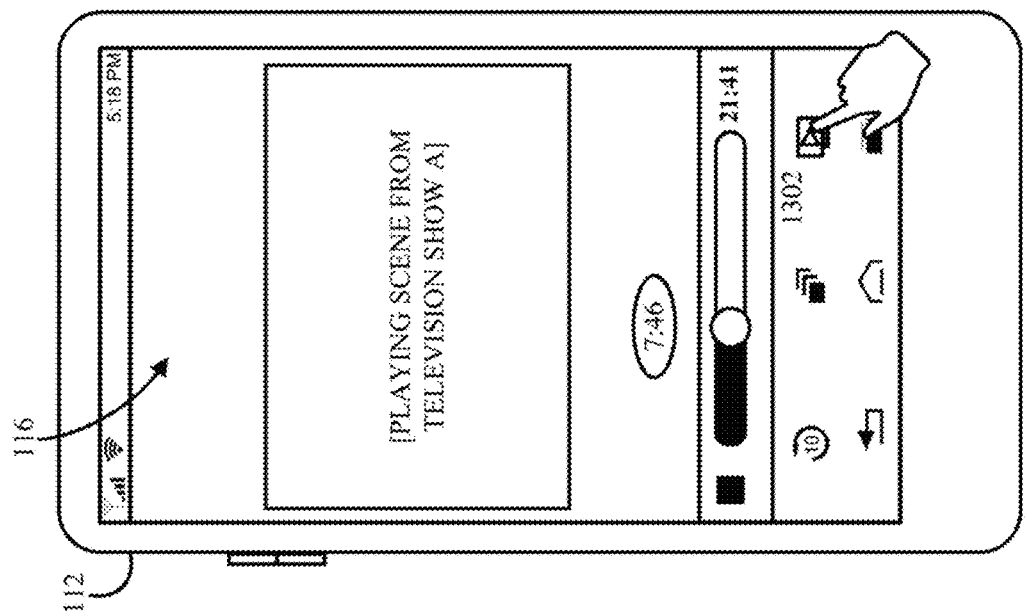
FIG. 13A

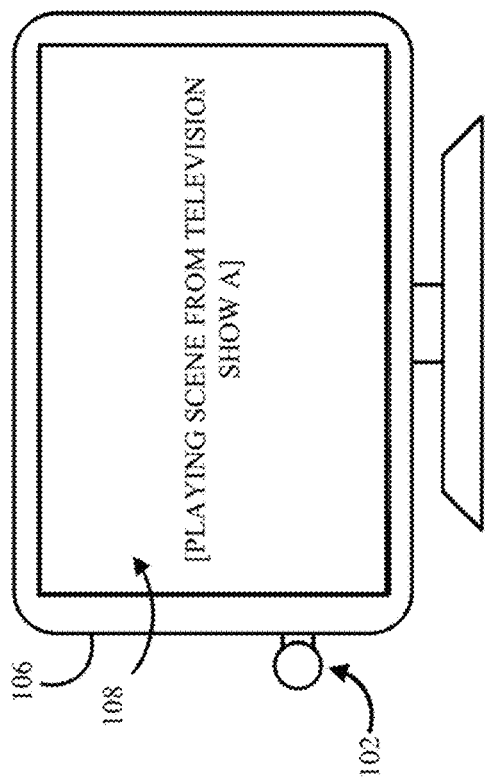
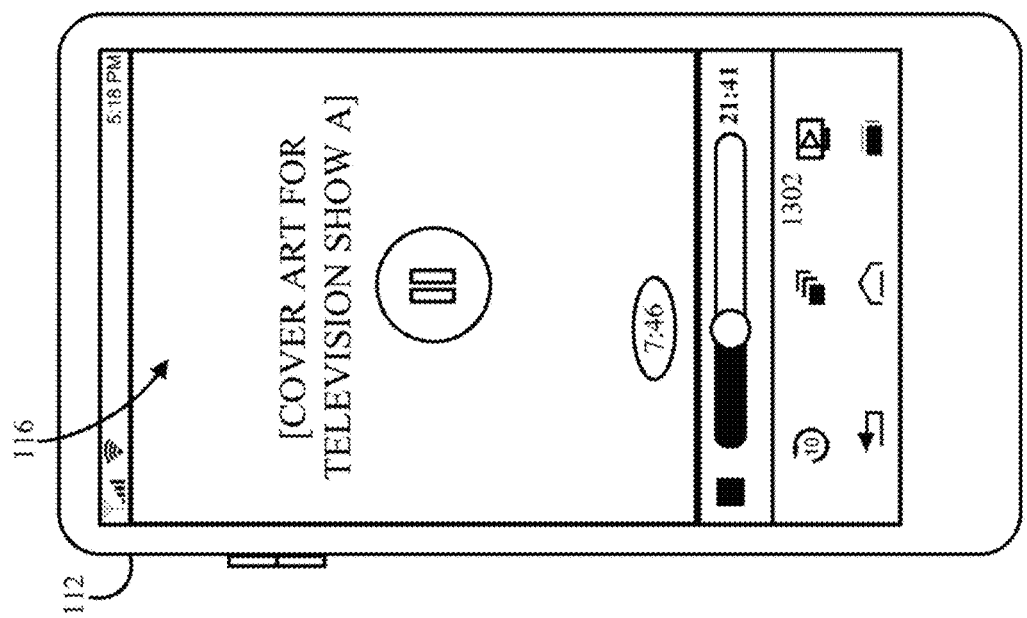
FIG. 13C

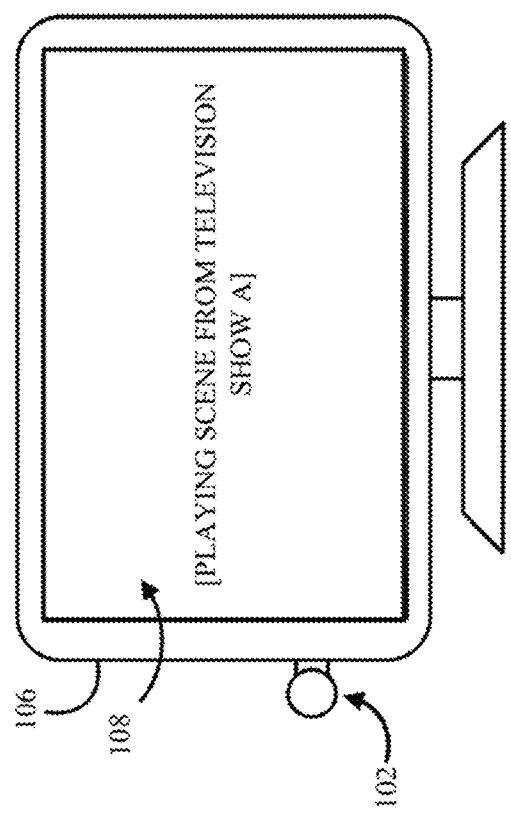
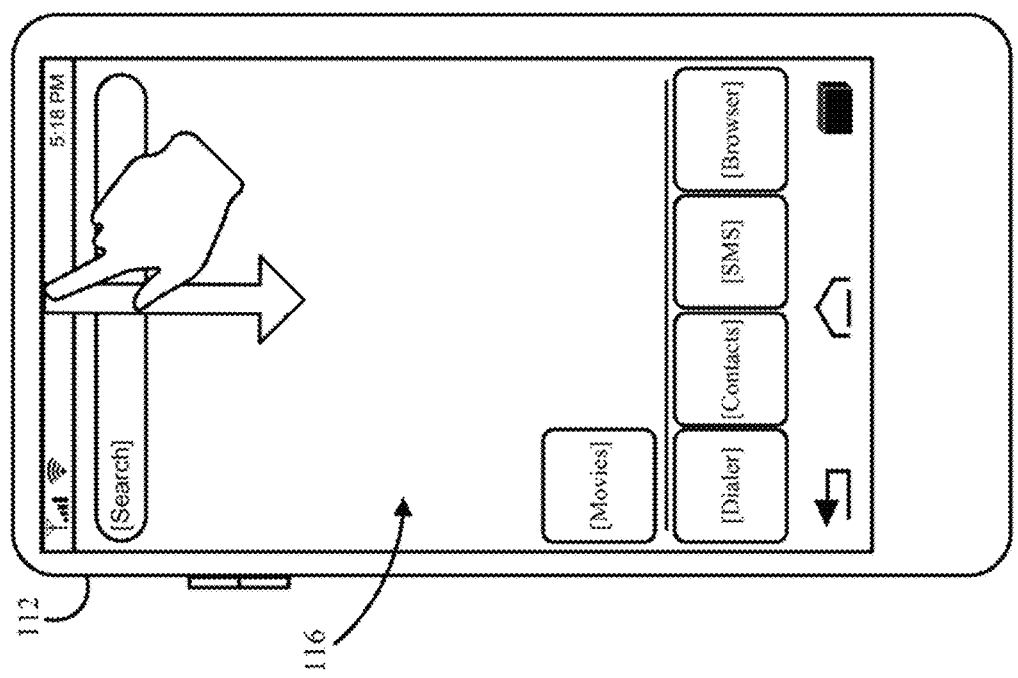
FIG. 13D

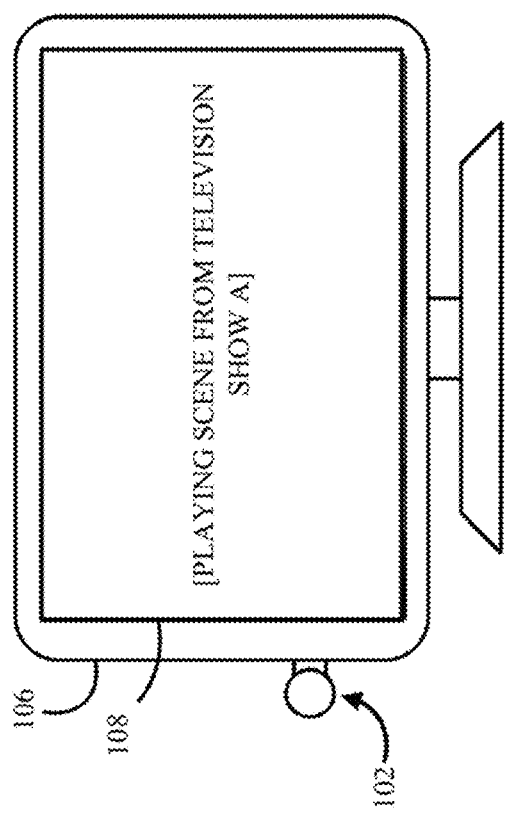
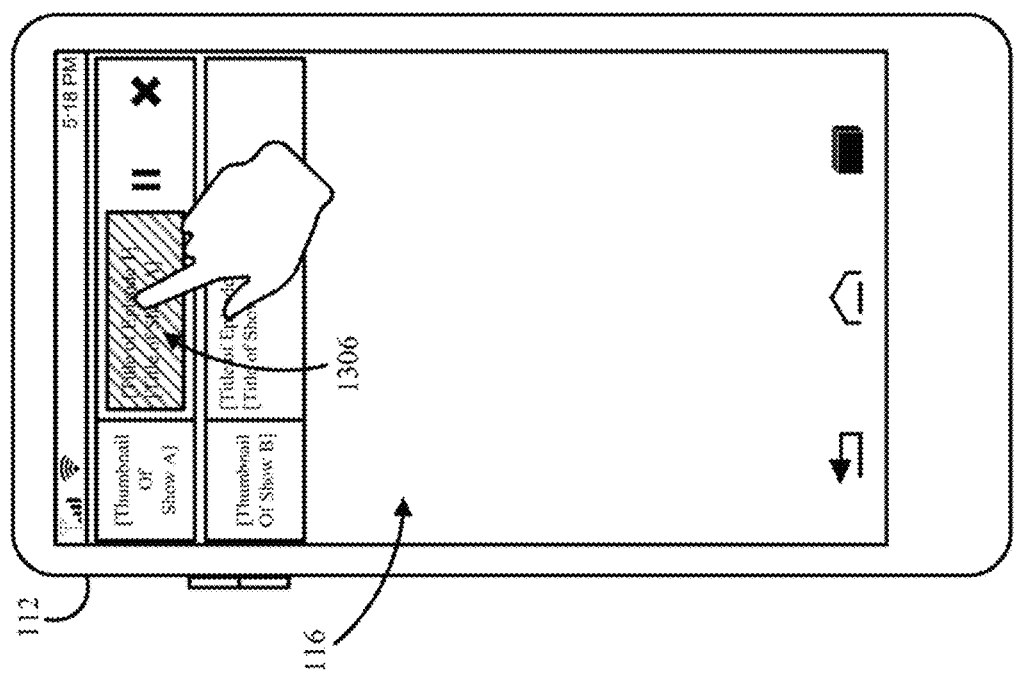
FIG. 13F

METHODS, SYSTEMS AND MEDIA FOR PRESENTING MEDIA CONTENT THAT WAS ADVERTISED ON A SECOND SCREEN DEVICE USING A PRIMARY DEVICE

CROSS-REFERENCE TO RELATED APPLICATIONS

This application is a continuation of U.S. patent application Ser. No. 14/879,974, filed Oct. 9, 2015, which is a continuation-in-part of U.S. patent application Ser. No. 14/600,420, filed Jan. 20, 2015, each of which is hereby incorporated by reference herein in its entirety.

TECHNICAL FIELD

The disclosed subject matter relates to methods, systems and media for presenting media content that was advertised on a second screen device using a primary screen device. More particularly, the disclosed subject matter relates to presenting media content that was advertised on a second screen device using a primary screen device, where the advertisements and/or media content can be selected and/or presented based on subscription information for one or more services associated with a user account.

BACKGROUND

Personal electronic devices are often used to browse the Internet, while devices having larger displays, such as televisions, are often used for consuming media content. As such, many producers and/or owners of media content may wish to advertise that media content to users of personal electronic devices using Internet advertisements. However, a user may prefer to watch media content on a television, rather than on a screen of the personal electronic device, which can be more pronounced for media content such as television shows and movies. This combination of browsing preferences and viewing preferences can make advertising media content on a personal electronic device less attractive than it otherwise might be.

Accordingly, methods, systems and media for presenting media content that was advertised on a second screen device using a primary screen device are desirable.

SUMMARY

In accordance with some implementations of the disclosed subject matter, mechanisms for presenting media content that was advertised on a second screen device using a primary screen device are provided.

In accordance with some implementations of the disclosed subject matter, a method for advertising media content to a user is provided, the method comprising: receiving, using a hardware processor, a first advertisement request from a computing device executing a browser application, wherein the advertisement request is associated with a first web page; receiving first information indicating that the computing device is associated with a first media presentation device; in response to the first advertisement request, selecting a first advertisement for first media content based at least in part on the first information; causing the first advertisement to be presented by the browser application, wherein the first advertisement causes the browser application to execute a first set of instructions in response to detecting interaction with the first advertisement, wherein the first set of instructions, when executed by the browser application, cause the first media presentation device to request the first media content from an address associated with the first media content; receiving an indication that the first media content has been presented by the first media presentation device; receiving a second advertisement request from the browser application, wherein the second advertisement request is associated with a second web page; receiving second information indicating that the computing device is associated with a second media presentation device; in response to the second advertisement request, selecting a second advertisement for second media content based at least in part on the second information and the indication that the first media content has been presented, wherein the first media content and the second media content are related; and causing the second advertisement to be presented by the browser application, wherein the second advertisement causes the browser application to execute a second set of instructions in response to detecting interaction with the second advertisement, wherein the second set of instructions, when executed by the browser application, cause the second media presentation device to request the second media content from an address associated with the second media content.

In accordance with some implementations of the disclosed subject matter, a system for advertising media content to a user is provided, the system comprising: a hardware processor that is programmed to: receive a first advertisement request from a computing device executing a browser application, wherein the advertisement request is associated with a first web page; receive first information indicating that the computing device is associated with a first media presentation device; in response to the first advertisement request, select a first advertisement for first media content based at least in part on the first information; cause the first advertisement to be presented by the browser application, wherein the first advertisement causes the browser application to execute a first set of instructions in response to detecting interaction with the first advertisement, wherein the first set of instructions, when executed by the browser application, cause the first media presentation device to request the first media content from an address associated with the first media content; receive an indication that the first media content has been presented by the first media presentation device; receive a second advertisement request from the browser application, wherein the second advertisement request is associated with a second web page; receive second information indicating that the computing device is associated with a second media presentation device; in response to the second advertisement request, select a second advertisement for second media content based at least in part on the second information and the indication that the first media content has been presented, wherein the first media content and the second media content are related; and cause the second advertisement to be presented by the browser application, wherein the second advertisement causes the browser application to execute a second set of instructions in response to detecting interaction with the second advertisement, wherein the second set of instructions, when executed by the browser application, cause the second media presentation device to request the second media content from an address associated with the second media content.

In accordance with some implementations of the disclosed subject matter, a non-transitory computer-readable medium containing computer executable instructions that, when executed by a processor, cause the processor to perform a method for advertising media content to a user is provided, the method comprising: receiving a first advertisement request from a computing device executing a browser application, wherein the advertisement request is associated with a first web page; receiving first information indicating that the computing device is associated with a first media presentation device; in response to the first advertisement request, selecting a first advertisement for first media content based at least in part on the first information; causing the first advertisement to be presented by the browser application, wherein the first advertisement causes the browser application to execute a first set of instructions in response to detecting interaction with the first advertisement, wherein the first set of instructions, when executed by the browser application, cause the first media presentation device to request the first media content from an address associated with the first media content; receiving an indication that the first media content has been presented by the first media presentation device; receiving a second advertisement request from the browser application, wherein the second advertisement request is associated with a second web page; receiving second information indicating that the computing device is associated with a second media presentation device; in response to the second advertisement request, selecting a second advertisement for second media content based at least in part on the second information and the indication that the first media content has been presented, wherein the first media content and the second media content are related; and causing the second advertisement to be presented by the browser application, wherein the second advertisement causes the browser application to execute a second set of instructions in response to detecting interaction with the second advertisement, wherein the second set of instructions, when executed by the browser application, cause the second media presentation device to request the second media content from an address associated with the second media content.

In accordance with some implementations of the disclosed subject matter, a system for advertising media content to a user is provided, the system comprising: means for receiving a first advertisement request from a computing device executing a browser application, wherein the advertisement request is associated with a first web page; means for receiving first information indicating that the computing device is associated with a first media presentation device; means, responsive to the means for receiving the first advertisement request, for selecting a first advertisement for first media content based at least in part on the first information; means for causing the first advertisement to be presented by the browser application, wherein the first advertisement causes the browser application to execute a first set of instructions in response to detecting interaction with the first advertisement, wherein the first set of instructions, when executed by the browser application, cause the first media presentation device to request the first media content from an address associated with the first media content; means for receiving an indication that the first media content has been presented by the first media presentation device; means for receiving a second advertisement request from the browser application, wherein the second advertisement request is associated with a second web page; means for receiving second information indicating that the computing device is associated with a second media presentation device; means, responsive to the means for receiving the first advertisement request, for selecting a second advertisement for second media content based at least in part on the second information and the indication that the first media content has been presented, wherein the first media content and the second media content are related; and means for causing the second advertisement to be presented by the browser application, wherein the second advertisement causes the browser application to execute a second set of instructions in response to detecting interaction with the second advertisement, wherein the second set of instructions, when executed by the browser application, cause the second media presentation device to request the second media content from an address associated with the second media content.

In some implementations, the system further comprises means for detecting that an area corresponding to the first advertisement has been selected using the computing device.

In some implementations, the system further comprises means for detecting that a cursor of the computing device has been in an area corresponding to the first advertisement for at least a threshold amount of time.

In some implementations, the system further comprises means receiving status information of the first media presentation device, and wherein selecting the first advertisement is selected based at least in part on the status information.

In some implementations, the means for selecting the first advertisement comprises means for selecting the first advertisement from a plurality of advertisements associated with the web page.

In some implementations, the means for selecting the first advertisement comprises means for using a real-time bidding process to select the first advertisement.

In some implementations, information derived from the first information is made available to bidders in the real-time bidding process.

In some implementations, the first web page is a web page including a plurality of search engine search results, and wherein the first advertisement is a text-based search advertisement.

In accordance with some implementations of the disclosed subject matter, a method for advertising media content to a user is provided, the method comprising: receiving, using a hardware processor, information indicating that a media presentation device has presented first media content; receiving an advertisement request from a computing device associated with the media presentation device, wherein the media presentation device is a separate device that is capable of receiving media content from a remote source and causing the received media content to be presented by a display device; in response to the advertisement request, selecting an advertisement for second media content based at least in part on the information indicating that the first media content has been presented by the media presentation device, wherein the first media content and the second media content are related; and causing the second advertisement to be presented by computing device, wherein the second advertisement is associated with instructions that, in response to the computing device receiving input indicating interaction with the advertisement, cause the computing device to instruct the media presentation device to present the second media content.

In accordance with some implementations of the disclosed subject matter, a system for advertising media content to a user is provided, the system comprising: a hardware processor that is programmed to: receive information indicating that a media presentation device has presented first media content; receive an advertisement request from a computing device associated with the media presentation device, wherein the media presentation device is a separate device that is capable of receiving media content from a remote source and causing the received media content to be presented by a display device; in response to the advertisement request, select an advertisement for second media content based at least in part on the information indicating that the first media content has been presented by the media presentation device, wherein the first media content and the second media content are related; and cause the second advertisement to be presented by computing device, wherein the second advertisement is associated with instructions that, in response to the computing device receiving input indicating interaction with the advertisement, cause the computing device to instruct the media presentation device to present the second media content.

In accordance with some implementations of the disclosed subject matter, a non-transitory computer-readable medium containing computer executable instructions that, when executed by a processor, cause the processor to perform a method for advertising media content to a user is provided, the method comprising: receiving information indicating that a media presentation device has presented first media content; receiving an advertisement request from a computing device associated with the media presentation device, wherein the media presentation device is a separate device that is capable of receiving media content from a remote source and causing the received media content to be presented by a display device; in response to the advertisement request, selecting an advertisement for second media content based at least in part on the information indicating that the first media content has been presented by the media presentation device, wherein the first media content and the second media content are related; and causing the second advertisement to be presented by computing device, wherein the second advertisement is associated with instructions that, in response to the computing device receiving input indicating interaction with the advertisement, cause the computing device to instruct the media presentation device to present the second media content.

In accordance with some implementations of the disclosed subject matter, a system for advertising media content to a user is provided, the system comprising: means for receiving information indicating that a media presentation device has presented first media content; means for receiving an advertisement request from a computing device associated with the media presentation device, wherein the media presentation device is a separate device that is capable of receiving media content from a remote source and causing the received media content to be presented by a display device; means, responsive to the advertisement request, for selecting an advertisement for second media content based at least in part on the information indicating that the first media content has been presented by the media presentation device, wherein the first media content and the second media content are related; and means for causing the second advertisement to be presented by computing device, wherein the second advertisement is associated with instructions that, in response to the computing device receiving input indicating interaction with the advertisement, cause the computing device to instruct the media presentation device to present the second media content.

In some implementations, the information indicating that the media presentation device has presented the first media content is included in a browser cookie stored by the computing device, and the means for receiving the information indicating that the media presentation device has presented the first media content comprises means for receiving at least a portion of the information included in the cookie.

In some implementations, at least a portion of the information included in the cookie is encoded, and the means for selecting the advertisement for second media content comprises means for making at least the encoded information available to a plurality of advertisers including an advertiser associated with the advertisement.

In some implementations, the information indicating that the media presentation device has presented the first media content includes identifying information of the computing device which is used to determine that the media presentation device has presented the first media content, and the means for selecting the advertisement for second media content comprises means for making information derived from the identifying information available to a plurality of advertisers including an advertiser associated with the advertisement.

In some implementations, the systems further comprises means for detecting that an area corresponding to the first advertisement has been selected using the computing device.

In some implementations, the system further comprises means for detecting that a cursor of the computing device has been in an area corresponding to the first advertisement for at least a threshold amount of time.

In some implementations, the system further comprises means for receiving status information of the media presentation device, and means for selecting the first advertisement based at least in part on the status information.

In accordance with some implementations of the disclosed subject matter, a method for advertising media content to a user is provided, the method comprising: receiving, using a hardware processor, an advertisement request from a computing device; receiving association information indicating that the computing device is associated with a media presentation device, wherein the media presentation device is a separate device that is capable of receiving media content from a remote source and causing the received media content to be presented by a display device and wherein the computing device is associated with a user account; receiving user account information associated with the user account; in response to the advertisement request, selecting an advertisement for media content based at least in part on the association information and the user account information; determining whether an indicator of subscription status of the user account to a service is to be presented in connection with the selected advertisement based on the information associated with the user account; causing the advertisement to be presented by computing device, wherein the advertisement is associated with instructions that, in response to the computing device receiving input indicating interaction with the advertisement, cause the computing device to instruct the media presentation device to present the media content and the indicator of subscription status; receiving input indicating that the indicator of subscription status has been selected; causing an application associated with the service to be installed on at least one of the computing device and the media playback device; and updating the subscription status of the user account in connection with the service.

In accordance with some implementations of the disclosed subject matter, a system for advertising media content to a user is provided, the system comprising: a hardware processor that is programmed to: receive an advertisement request from a computing device; receive association information indicating that the computing device is associated with a media presentation device, wherein the media presentation device is a separate device that is capable of receiving media content from a remote source and causing the received media content to be presented by a display device and wherein the computing device is associated with a user account; receive user account information associated with the user account; in response to the advertisement request, select an advertisement for media content based at least in part on the association information and the user account information; determine whether an indicator of subscription status of the user account to a service is to be presented in connection with the selected advertisement based on the information associated with the user account; cause the advertisement to be presented by computing device, wherein the advertisement is associated with instructions that, in response to the computing device receiving input indicating interaction with the advertisement, cause the computing device to instruct the media presentation device to present the media content and the indicator of subscription status; receive input indicating that the indicator of subscription status has been selected; cause an application associated with the service to be installed on at least one of the computing device and the media playback device; and update the subscription status of the user account in connection with the service.

In accordance with some implementations of the disclosed subject matter, a non-transitory computer-readable medium containing computer executable instructions that, when executed by a processor, cause the processor to perform a method for advertising media content to a user is provided, the method comprising: receiving an advertisement request from a computing device; receiving association information indicating that the computing device is associated with a media presentation device, wherein the media presentation device is a separate device that is capable of receiving media content from a remote source and causing the received media content to be presented by a display device and wherein the computing device is associated with a user account; receiving user account information associated with the user account; in response to the advertisement request, selecting an advertisement for media content based at least in part on the association information and the user account information; determining whether an indicator of subscription status of the user account to a service is to be presented in connection with the selected advertisement based on the information associated with the user account; causing the advertisement to be presented by computing device, wherein the advertisement is associated with instructions that, in response to the computing device receiving input indicating interaction with the advertisement, cause the computing device to instruct the media presentation device to present the media content and the indicator of subscription status; receiving input indicating that the indicator of subscription status has been selected; causing an application associated with the service to be installed on at least one of the computing device and the media playback device; and updating the subscription status of the user account in connection with the service.

In accordance with some implementations of the disclosed subject matter, a system for advertising media content to a user is provided, the system comprising: means for receiving an advertisement request from a computing device; means for receiving association information indicating that the computing device is associated with a media presentation device, wherein the media presentation device is a separate device that is capable of receiving media content from a remote source and causing the received media content to be presented by a display device and wherein the computing device is associated with a user account; means for receiving user account information associated with the user account; means for selecting an advertisement for media content based at least in part on the association information and the user account information in response to the advertisement request; means for determining whether an indicator of subscription status of the user account to a service is to be presented in connection with the selected advertisement based on the information associated with the user account; means for causing the advertisement to be presented by computing device, wherein the advertisement is associated with instructions that, in response to the computing device receiving input indicating interaction with the advertisement, cause the computing device to instruct the media presentation device to present the media content and the indicator of subscription status; means for receiving input indicating that the indicator of subscription status has been selected; means for causing an application associated with the service to be installed on at least one of the computing device and the media playback device; and means for updating the subscription status of the user account in connection with the service.

In some implementations, the system further comprises means for detecting that an area corresponding to the advertisement has been selected using the computing device.

In some implementations, the system further comprises means for detecting that a cursor of the computing device has been in an area corresponding to the advertisement for at least a threshold amount of time.

In some implementations, the system further comprises means for receiving status information of the media presentation device, and wherein the advertisement is selected based at least in part on the status information.

In some implementations, the system further comprises means for selecting the advertisement from a plurality of advertisements, wherein each of the plurality of advertisements is associated with media content for presentation by the media presentation device and wherein the media content is associated with one or more services.

In some implementations, the user account information includes one or more services that are subscribed to by the user account.

In some implementations, the system further comprises means for selecting the advertisement associated with the one or more services that are subscribed to be the user account.

In some implementations, the system further comprises means for selecting the advertisement from a plurality of advertisement associated with a service related to the one or more services that are subscribed to by the user account.

In some implementations, the indicator of subscription status includes a prompt to subscribe to the service and the system further comprises: means for receiving subscription information in the prompt to subscribe to the service; and means for enabling the media playback device to playback media content provided by the service through the application executing on the media playback device.

In some implementations, the system further comprises: means for receiving payment information associated with the user account; and means for collecting a payment using the payment information associated with the user account in response to playing back media content provided by the service.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 6 shows an example of a computing device being used to present an advertisement that can be selected to cause advertised media content to be presented by a media receiving device and/or media presentation device in accordance with some implementations of the disclosed subject matter.

FIGS. 13A-13F show an example of using the mechanisms described herein for presenting content used with a computing device in accordance with some implementations of the disclosed subject matter.

DETAILED DESCRIPTION

Figure 1:
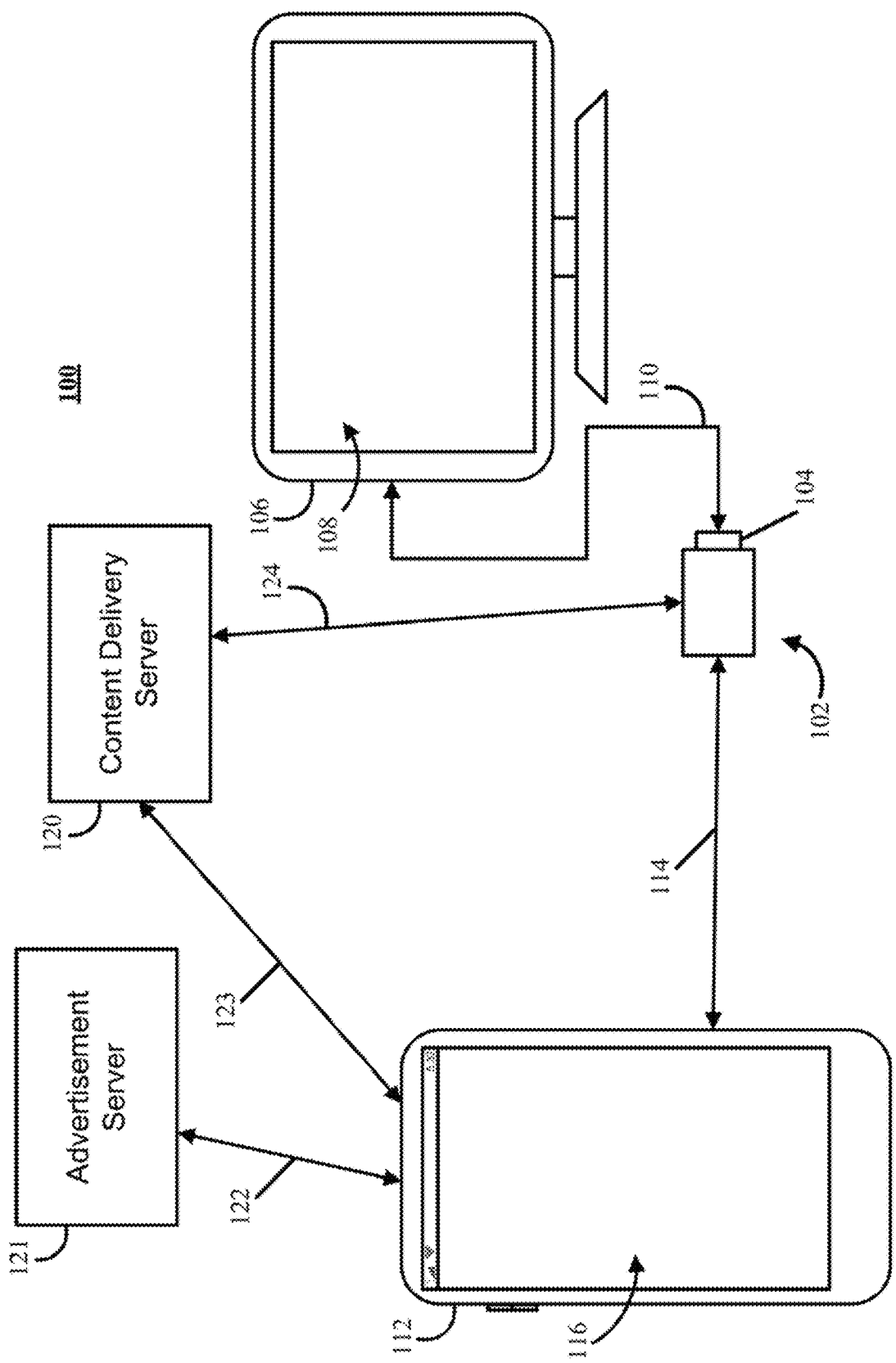
FIG. 1 shows an example of a system for presenting media content that was advertised on a second screen device using a primary screen device in accordance with some implementations of the disclosed subject matter.

In accordance with some implementations of the disclosed subject matter, mechanisms (which can include systems, methods and media) for presenting media content that was advertised on a second screen device using a primary screen device are provided.

In some implementations, these mechanisms can allow an advertiser to present an advertisement to a user on a computing device (such as a smartphone, a tablet computer, or a personal computer) that facilitates presentation of content associated with the advertisement (such as an episode of a television show or a movie) to be presented on a larger and/or higher definition display such as a high definition television, while allowing the user to continue browsing unrelated content on the computing device. For example, a user may be browsing the Internet using a smartphone while watching a television show using a set-top box coupled to a television, and the user can be presented with an advertisement for a movie that can be presented using a media receiving device coupled to a different input of the television. In accordance with some implementations of the subject matter described herein, the user can interact with the advertisement for the movie (e.g., by selecting the advertisement), and cause the media receiving device to switch an input of the television to the media receiving device and commence presentation of the movie. As another example, a user may be browsing the Internet using a smartphone while watching a television show using a media receiving device coupled to a television, and the user can be presented with an advertisement for a different television show that can be presented using the content receiving device. In accordance with some implementations of the subject matter described herein, the user can interact with the advertisement for the different television show (e.g., by selecting the advertisement), and cause the media receiving device to queue the different television show for presentation after the current television show (and/or any other suitable media content already queued) is concluded. In the preceding example, the currently presented television show can be presented as a result of a request that was submitted from an advertisement and/or using any other suitable technique, from the user's smartphone and/or from any other suitable computing device (such as another user's smartphone, a tablet computer, etc.)

In some implementations, these mechanisms can determine whether a user having a user account is a subscriber to a service and, based on the determined subscription information, allow an advertiser to present content, such as advertising content corresponding to a media content item. For example, in response to determining that a user account associated with a user being presented with an advertisement is not currently subscribed to a service but is likely to subscribe to the service, such as an over-the-top content service, the mechanisms can present the advertisement with a prompt relating to the service. Such a prompt can include a selectable option for downloading a media application corresponding to the service, a selectable option for providing user account information to sign up for the service, a selectable option for using the service for a limited duration (e.g., a trial period of access to content provided by the service), etc. In another example, in response to determining that a user account associated with a user being presented with an advertisement is not currently subscribed to a service but is likely to subscribe to the service, the mechanisms can determine when to provide the prompt to sign up for the service—e.g., along with or subsequent to the advertisement presented on the computing device; prior to, during, or subsequent to the presentation of media content corresponding to the advertisement on the media receiving device; between the presentation of the advertisement on the computing device and the presentation of the media content on the primary screen device via the media receiving device; between the presentation of a first media content item on a display device and the presentation of a second media content item that is associated with the selected advertisement and that is caused to be presented on the display device by the media receiving device; etc. In yet another example, in response to determining that a user account is currently subscribed to a service, the advertiser can present an advertisement to a user on a second screen device that facilitates presentation of content from that service on a primary screen device via a media receiving device. In such an example, the determination that the user account is currently subscribed to a service can be used to present advertisements and/or content from the subscribed service, from a service similar to the subscribed service, etc.

Alternatively, in some implementations, the mechanisms can include determining an interest type or category of service that the user of the user account has subscribed to or is likely to subscribe to. For example, in response to determining that the user of the user account has been placed in a particular category based on previous subscription information, the mechanisms can recommend particular advertisements that include prompts to subscribe to a similar or related service (e.g., a service in the same category of services). In another example, in response to determining that the user of the user account has been placed in a particular category based on previous subscription information, the mechanisms can recommend particular advertisements that include use of a similar or related service (e.g., a service in the same category of services) for a particular duration of time. In yet another example, in response to determining that the user of the user account has been placed in a particular category based on previous subscription information, the mechanisms can recommend particular advertisements for presentation on a second screen device that are associated with media content for presentation on a primary screen device via a media rendering device, where the media content is provided by a similar or related service to the services that the user of the user account has subscribed. In response to presenting the media content from the similar or related service on the primary screen device, the mechanisms can transmit a request to the second screen device that the user of the user account subscribe to the service (e.g., by transmitting the user account information to the service that provided the media content). In some implementations, the request can include payment information associated with the user account.

Alternatively, in some implementations, the mechanisms can select an advertisement for presentation on a second screen device, which includes instructions to present media content on a primary screen device via a media receiving device, and determine whether a subscription prompt or any other suitable subscription-related action should be presented with the selected advertisement or with the media content associated with the selected advertisement. For example, in response to determining that the user of the user account has an interest in subscribing to a service associated with the media content corresponding to the selected advertisement, the mechanisms can present a subscription prompt concurrently with the advertisement being presented on the second screen device that prompts the user to subscribe to the service. In another example, in response to determining that the user of the user account has subscribed to the service associated with the media content corresponding to the selected advertisement, the mechanisms can present an authentication prompt to sign into the service subsequent to the advertisement being presented on the second screen device. In yet another example, in response to determining that the user of the user account has subscribed to the service associated with the media content corresponding to the selected advertisement, the mechanisms can automatically, without user input, transmit user account information to the service, thereby signing into the service and associating the playback of the media content with the user account.

In some implementations, in response to being presented with a media content item, the mechanisms can store retargeting information such that the user of the primary screen device and/or the second screen device can be presented with an opportunity to subscribe to a service or purchase media content from a service during a subsequent browsing session or at a later time. For example, in response to determining that the user has interacted with an advertisement being presented on a second screen device during a browsing session and in response to presenting the associated media content on a primary screen device, the mechanisms can use retargeting information corresponding to such presentations to present a subsequent opportunity to subscribe to the service that presented the media content. In a more particular example, the mechanisms can store retargeting information indicating that the user selected an advertisement presented on the second screen device and consumed the media content corresponding to the selected advertisement on the primary screen device, where, at a later time such as a subsequent browsing session on the second screen device, the user can be prompted to subscribe to a service that provided the media content or an opportunity to purchase additional media content (e.g., the next episode) from a service that provided the media content based on the retargeting information.

It should be noted that the prompts and/or subscription requests can be presented in any suitable location. For example, the subscription request can be included in the advertisement presented on the second screen device, in an interface presented on the second screen device, etc. In another example, the subscription request can be presented on primary screen device via the media receiving device in response to completing the playback of the media content on the primary screen device. In yet another example, the user of the user account can be provided with an option for indicating where such subscription requests are to be presented (e.g., directed to the primary screen device, directed to the second screen device, directed to an alternate device, etc.).

These mechanisms can be used in a variety of applications. These mechanisms can, for example, allow the advertiser to customize which advertisements are presented on a second screen device, where interaction with the advertisement causes the presentation of related media content on a primary screen device via a media receiving device. These mechanisms can also, for example, evaluate whether a selected advertisement should be presented with subscription-related actions for one or more content providers.

Turning to FIG. 1, an example 100 of a system for presenting media content that was advertised on a second screen device using a primary screen device is shown in accordance with some implementations. In some implementations, system 100 can include a media receiving device 102, which can include an input/output connector 104. Input/output connector 104 can be any suitable input and/or output connector for communicating with a media playback device 106. For example, input/output connector 104 can be a High-Definition Multimedia Interface (HDMI) port, a Universal Serial Bus (USB) connector (e.g., a USB 3.0 connector), a THUNDERBOLT connector, a Digital Visual Interface (DVI) connector, a TOSLINK connector (e.g., a fiber optic audio connector), a Separate Video (S-Video) Connector, any other suitable connector and/or any suitable combination of connectors.

In some implementations, media playback device 106 can be a device that includes hardware and/or software for presenting media content received from one or more sources of media content. For example, media playback device 106 can include a television, a smart television, a monitor, a set-top box, an audio video (AV) receiver, any other suitable media playback device and/or any suitable combination thereof. More particularly, media playback device 106 can include a display 108, speakers, hardware and/or software for rendering media content such as analog and/or digital video and/or audio data, a power supply, etc. Media playback device 106 can include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In some implementations, media receiving device 102 can be connected to media playback device 106 by a connection 110. Media receiving device 102 and media playback device 106 can be connected using any suitable technique(s). For example, connection 110 can include a plug of input/output connector 104 of media receiving device 102 inserted in a corresponding receptacle port of media playback device 106. As another example, a suitable cable, such as an HDMI cable, can be connected between input/output connector 104 and a port of media playback device 106. Additionally or alternatively, media receiving device 102 can be included as hardware and/or software of media playback device 106.

In some implementations, media receiving device 102 can be coupled to a computing device 112 using a communication link 114. Computing device 112 can be any suitable computing device, such as a smartphone, a tablet computer, a wearable computer, a laptop computer, a personal computer, an electronic reader, a digital media receiver, a smart television, a game console, any other suitable computing device, or any suitable combination thereof. In some implementations, communication link 114 can include any suitable communication link, for example, as described below in connection with FIG. 2. Additionally, communication link 114 can include a network, such as a local area network (LAN) having wired and/or wireless connections. Additionally or alternatively, communication link 114 can include a wireless connection between computing device 112 and media receiving device 102, such as an ad hoc wireless network. In some implementations, communications between computing device 112 and media receiving device 102 over communication link 114 can be encrypted using any suitable encryption technique(s). For example, messages sent from computing device 112 to media receiving device 102 can be encrypted using any suitable encryption scheme, for example, using a public key-private key pair for encryption and decryption of messages. As another example, communications over communication link 114 can be encrypted using Transport Layer Security (TLS).

In some implementations, computing device 112 can include a display 116 for presenting a user interface to a user. In some examples described herein, computing device 112 can be a mobile computing device such as a smartphone or a tablet computer, and display 116 can include a touchscreen for receiving input and displaying a user interface and/or media content to a user. Additionally or alternatively, in some examples described herein, computing device 112 can be a computing device such as a laptop computer or a desktop computer that uses any suitable input device or devices (e.g., a keyboard, a mouse, etc.), and display 116 can be used to display a user interface and/or media content to a user and may or may include a touchscreen for receiving input.

In some implementations, computing device 112 can communicate with an advertisement server 121 over a communication link 122. Computing device 112 can be used to present advertisements in response to instructions from advertisement server 121, where such advertisements may be directed to media content made available by a content delivery server 120. For example, a user can use computing device 112 to access content such as web pages, application content, media content, etc., from a variety of sources. In some implementations, such content can be presented using display 116 of computing device 112. In some implementations, computing device 112 can present one or more advertisements that were selected based on an advertisement request transmitted from computing device 112 to advertisement server 121. Additionally, in some implementations, computing device 112 can present a media content item that was selected using a content discovery server (not shown), by requesting the media content item from content delivery server 120 and receiving the media content item over a communication link 123. In some implementations, each of content delivery server 120 and/or advertisement server 121 can be implemented on any suitable number of servers. Additionally or alternatively, in some implementations, the functions performed by content delivery server 120 and advertisement server 121 can be performed by the same device (e.g., by a common server computer).

In some implementations, communication links 122 and/or 123 can include a local area network (e.g., a home network) and/or a non-local network (e.g., the Internet). For example, computing device 112 can be connected to a local area network (LAN) such as a home network, and can connect to advertising server 121 and/or content delivery server 120 through the Internet. As another example, content delivery server 120 can be connected to a LAN that is common to computing device 112. In a more particular example, content delivery server 120 and/or advertising server 121 can be located remotely from computing device 112, and communication links 122 and/or 123 can include a non-local network such as the Internet for accessing content from content delivery server 120, discovering content using a content discovery server (not shown) and/or requesting (and/or receiving) advertisements from advertisement server 121. In another more particular example, content delivery server 120 and/or advertising server 121 can be located locally to computing device 112, and communication links 122 and/or 123 can include a local network, such as a home network, to which content delivery server 120 and/or advertising server 121 are connected. In such an example, a non-local network of communication links 122 and/or 123 (if it exists) may not be used when accessing content from content delivery server 120 and/or requesting (and/or receiving) advertisements from advertisement server 121.

In some implementations, a user of computing device 112 can cause media content made available by content delivery server 120 to be transmitted to media receiving device 102, which can in turn cause the media content to be presented on display 108 of media playback device 106 to which media receiving device 102 is connected. In some implementations, media receiving device 102 can receive power from media playback device 106 through connection 110, and may only be available to receive media content when power is being received over connection 110 (e.g., when a port to which media receiving device 102 is connected is selected as an active input port).

In some implementations, a user can select a media content item that is to be presented from content delivery server 120 by indicating interest in an advertisement for the media content item (e.g., by selecting or clicking on the advertisement, by hovering a cursor pointing device over the advertisement, etc.) to cause the media content item to be presented using media receiving device 102. Presenting a media content item using media receiving device 102, in accordance with some implementations, is described below in connection with, for example, FIG. 4.

In some implementations, when a media content item is to be presented from content delivery server 120 using media receiving device 102, the media content item can be transmitted to media receiving device 102 over a communication link 124. Communication link 124 can include a local area network (e.g., a home network) and/or a non-local network (e.g., the Internet). For example, media receiving device 102 and computing device 112 can both be connected to a common LAN such as a home network, and can connect to content delivery server 120 through the Internet. As another example, content deliver server 120 can be connected to a LAN that is common to computing device 112 and/or media receiving device 102. In a more particular example, content delivery server 120 can be located remotely from media receiving device 102 and/or computing device 112, and communication link 124 can include a non-local network such as the Internet for accessing content from content delivery server 120. In another more particular example, content delivery server can be located locally to media receiving device 102 and/or computing device 112, and communication link 124 can include a local network, such as a home network, to which both media receiving device 102 and content delivery server 120 are connected. In such an example, a non-local network of communication link 124 (if it exists) may not be used when accessing content from content delivery server 120. As yet another example, media receiving device 102 and computing device 112 may not be connected to a same local network, and any communication between media receiving device 102 and computing device 112 can be sent through a non-local connection and one or more servers for facilitating communication between media receiving device 102 and computing device 112 that are not connected to the same local network.

In some implementations, a user can choose a media content item to be presented using media receiving device 102 from a memory of computing device 112 (e.g., the user can choose a video that is stored locally on computing device 112). Additionally or alternatively, a user can choose a media content item to be presented using media receiving device 102 that is stored on another computing device present on the same local area network (e.g., network attached storage, a memory of a personal computer on a home network, memory on a server on the same network, etc.). Such a media content item stored on a computing device connected to a local area network can be transmitted from computing device 112 to media receiver 102 over communication link 114 (or any other suitable communication link), without being transmitted through content delivery server 120.

Figure 2:
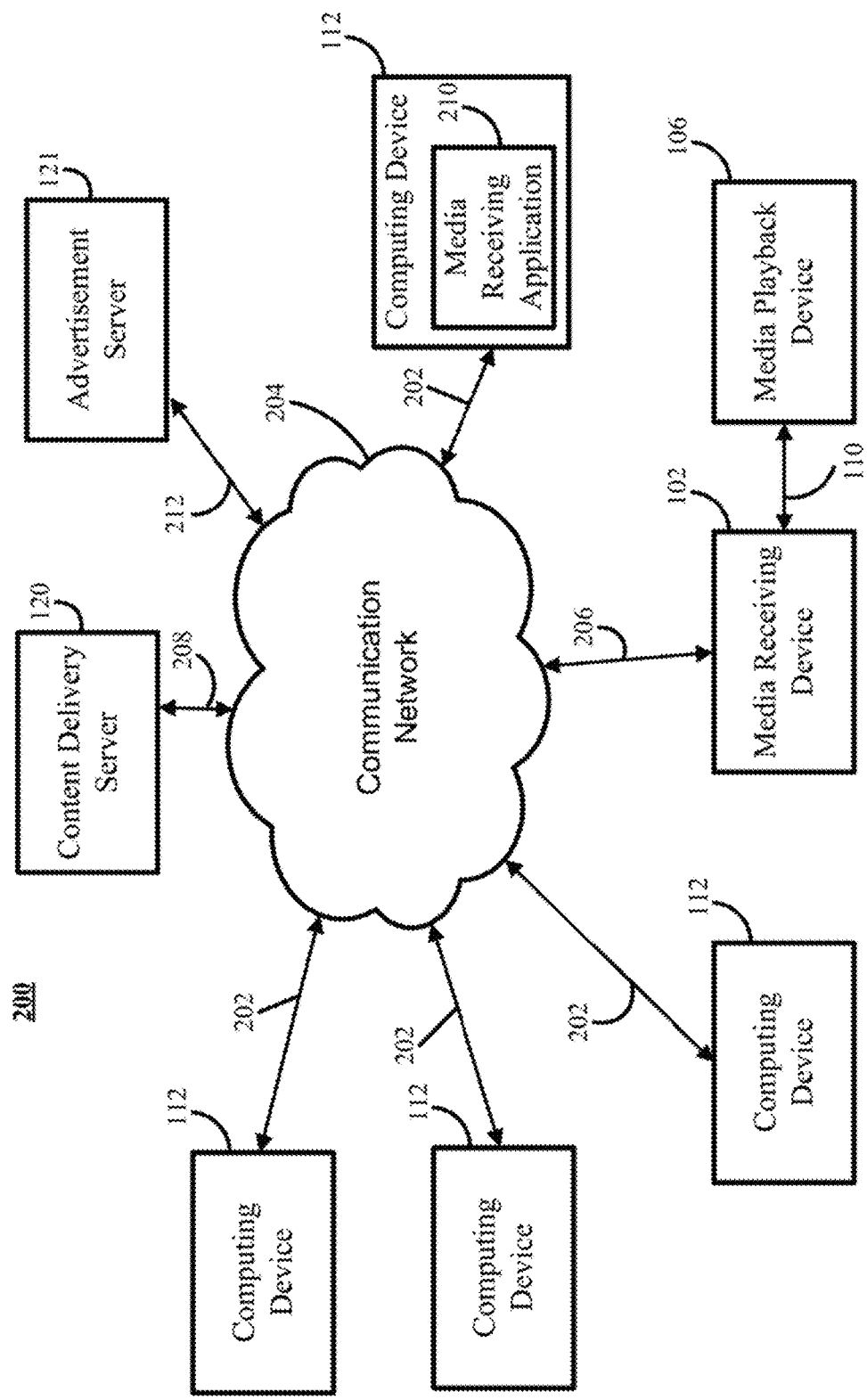
FIG. 2 shows an example of a generalized schematic diagram of a system on which the mechanisms for presenting media content that was advertised on a second screen device using a primary screen device as described herein can be implemented in accordance with some implementations of the disclosed subject matter.

FIG. 2 shows an example 200 of a generalized schematic diagram of a system on which the mechanisms for presenting media content that was advertised on a second screen device using a primary screen device as described herein can be implemented in accordance with some implementations of the disclosed subject matter. As illustrated, system 200 can include one or more computing devices 112. Computing devices 112 can be local to each other or remote from each other. Computing devices 112 can be connected by one or more communications links 202 to a communications network 204 that can be linked via a communications link 206 to media receiving device(s) 102, via a communication link 208 to content delivery server 120, via communication link 212 to advertisement server 121, and via communication links 202 to other computing devices 112.

In some implementations, each of the computing devices 112, content delivery server 120, advertisement server 121, and media receiving device 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 112 can be implemented as a smartphone, a tablet computer, a wearable computer, a personal computer, a laptop computer, a gaming console, a digital media receiver, a set-top box, a smart television, a server, etc.

Communications network 204 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 202, 206, 208, and 212 can be any communications links suitable for communicating data among computing devices 112, media receiving device 102, content delivery server 120, and advertisement server 121, such as network links, dial-up links, wireless links, hard-wired links, any other suitable communications links, or any suitable combination of such links. Computing devices 112 can discover, browser, download, stream, store, playback, transmit, and/or otherwise present content stored locally at computing device 112 or stored remotely at content delivery server 120 using any suitable technique(s).

System 200 can include media receiving device 102 as described above in connection with, for example, FIG. 1, and can include a media receiving application 210 installed on and/or running on one or more of computing devices 112, which can replicate the functions of media receiving device 102 using a computing device 112.

System 200 can include one or more content delivery servers 120. Content delivery server 120 can be any suitable server for providing access to media content items in accordance with the mechanisms described herein for presenting media content that was advertised on a second screen device using a primary screen device, such as a processor, a computer, a data processing device, and/or any suitable combination of such devices.

System 200 can include one or more advertisement servers 121. Advertisement server 121 can be any suitable server for facilitating the placement and/or deliver of advertisements to computing devices 112, which can include instructions for presenting media content items accessible on content delivery server 120 in accordance with the mechanisms described herein for presenting media content that was advertised on a second screen device using a primary screen device, such as a processor, a computer, a data processing device, and/or any suitable combination of such devices.

In some implementations, communications link 114 described above in connection with FIG. 1 can include communication link 202, communication network 204, and communication link 206; communications link 122 described above in connection with FIG. 1 can include communication link 202, communication network 204, and communication link 208; and communications link 124 described above in connection with FIG. 1 can include communication link 206, communication network 204, and communication link 208.

Figure 3:
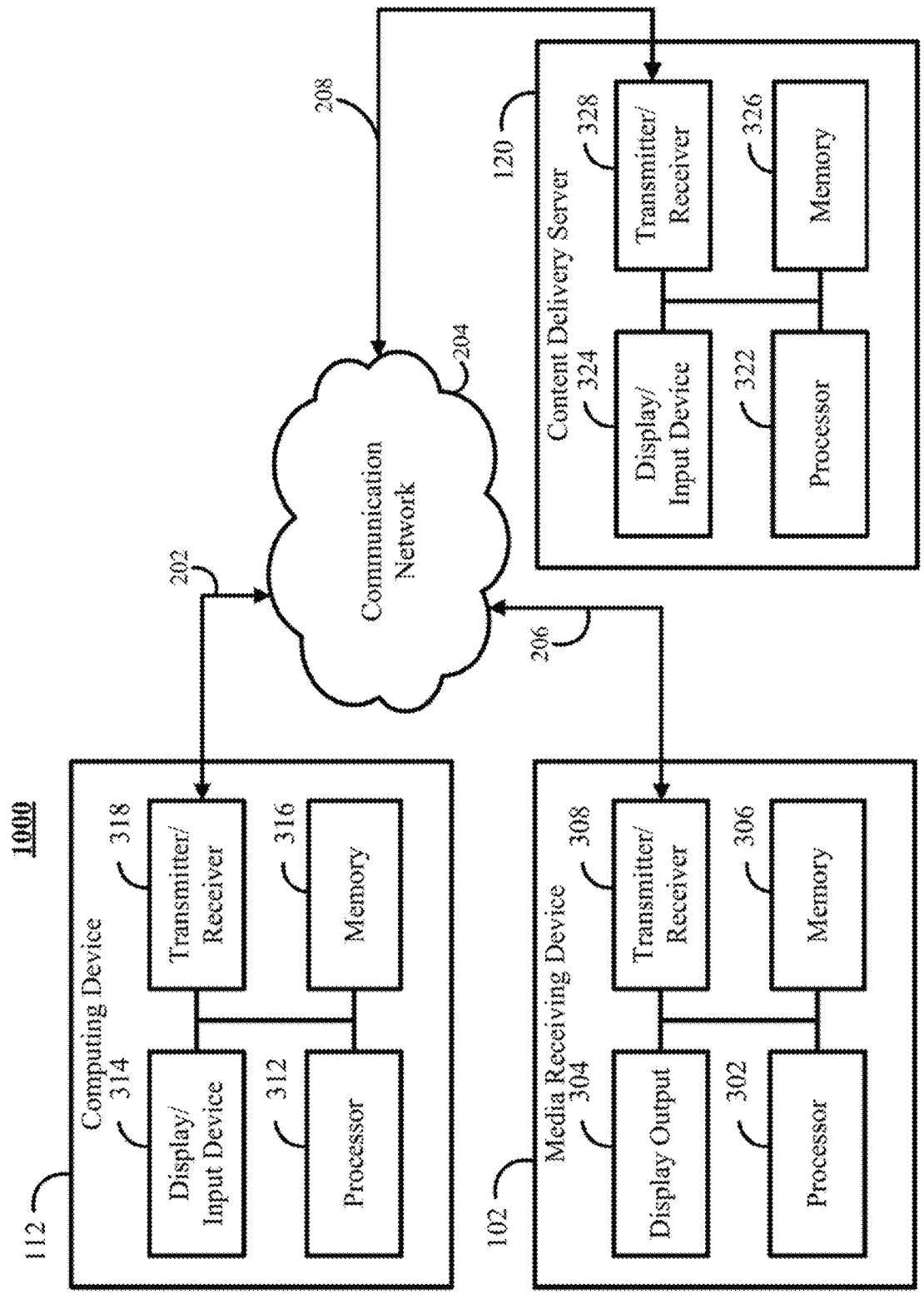
FIG. 3 shows an example of hardware that can be used to implement one of a computing device, a media receiving device, and a content delivery server depicted in FIGS. 1 and 2 in accordance with some implementations of the disclosed subject matter.

FIG. 3 shows an example 300 of hardware that can be used to implement one of computing devices 112, media receiving device 102, and content delivery server 120 depicted in FIGS. 1 and 2 in accordance with some implementations of the disclosed subject matter. Referring to FIG. 3, computing device 112 can include a hardware processor 312, a display/input device 314, memory 316, and a transmitter/receiver 318, which can be interconnected. In some implementations, memory 316 can include a storage device (such as a non-transitory computer-readable medium) for storing a computer program for controlling hardware processor 312.

Hardware processor 312 can use the computer program to present on display/input device 314 media content and/or an interface that allows a user to, among other things, cause media content presented on display/input device 314 and/or cause media content associated with an advertisement presented on display/input device 314 to be presented by a media receiving device, such as media receiving device 102. It should also be noted that data received through communications link 202 or any other communications links can be received from any suitable source. In some implementations, hardware processor 312 can send and receive data through communications link 202 or any other communication links using, for example, a transmitter, receiver, transmitter/receiver, transceiver, or any other suitable communication device, such as transmitter/receiver 318. Display/input device 314 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 318 can include any suitable transmitter and/or receiver for transmitting and/or receiving, among other things, media content including audio and/or video content.

Media receiving device 102 can include a hardware processor 302, a display output 304, memory 306, and a transmitter/receiver 308, which can be interconnected. In some implementations, memory 306 can include a storage device (such as a non-transitory computer-readable medium) for storing a computer program for controlling hardware processor 302.

Hardware processor 302 can use the computer program to provide media content and/or a user interface to display output 304 for presenting the media content and/or user interface on a media playback device. It should also be noted that data received through communications link 206 or any other communications links can be received from any suitable source. In some implementations, hardware processor 302 can send and receive data through communications link 206 or any other communication links using, for example, a transmitter, receiver, transmitter/receiver, transceiver, or any other suitable communication device, such as transmitter/receiver 308. Display output 304 can include hardware, software and/or firmware for outputting media content to a media playback device in any suitable format, and can include input/output connector 104 as described above in connection with FIG. 1. Transmitter/receiver 308 can include any suitable transmitter and/or receiver for transmitting and/or receiving, among other things, media content including audio and/or video content.

Content delivery server 120 can include a hardware processor 322, a display/input device 324, memory 326, and a transmitter/receiver 328, which can be interconnected. In some implementations, memory 326 can include a storage device for storing data received through communications link 208 or through other links. The storage device (such as a non-transitory computer-readable medium) can further include a server program for controlling hardware processor 322.

Hardware processor 322 can use the server program to communicate with computing device 112 and/or media receiving device 102, as well as provide access to media content. It should also be noted that data received through communications link 208 or any other communications links can be received from any suitable source. In some implementations, hardware processor 322 can send and receive data through communications link 208 or any other communication links using, for example, a transmitter, receiver, transmitter/receiver, transceiver, or any other suitable communication device, such as transmitter/receiver 328. In some implementations, hardware processor 322 can receive commands and/or values transmitted by one or more users. Display/input device 324 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 328 can include any suitable transmitter and/or receiver for transmitting and/or receiving, among other things, media content including audio and/or video content.

In some implementations, content delivery server 120 can be implemented in one server or can be distributed as any suitable number of servers. For example, multiple servers 120 can be implemented in various locations to increase reliability and/or increase the speed at which server 120 can communicate with computing devices 112 and/or media receiving device 102.

In some implementations, advertisement server 121 can be implemented using similar hardware to content delivery server 120, but can include a server program for facilitating the placement and/or deliver of advertisements to computing devices 112, which can include instructions for presenting media content items accessible on content delivery server 120 in accordance with the mechanisms described herein for presenting media content that was advertised on a second screen device using a primary screen device.

Figure 4:
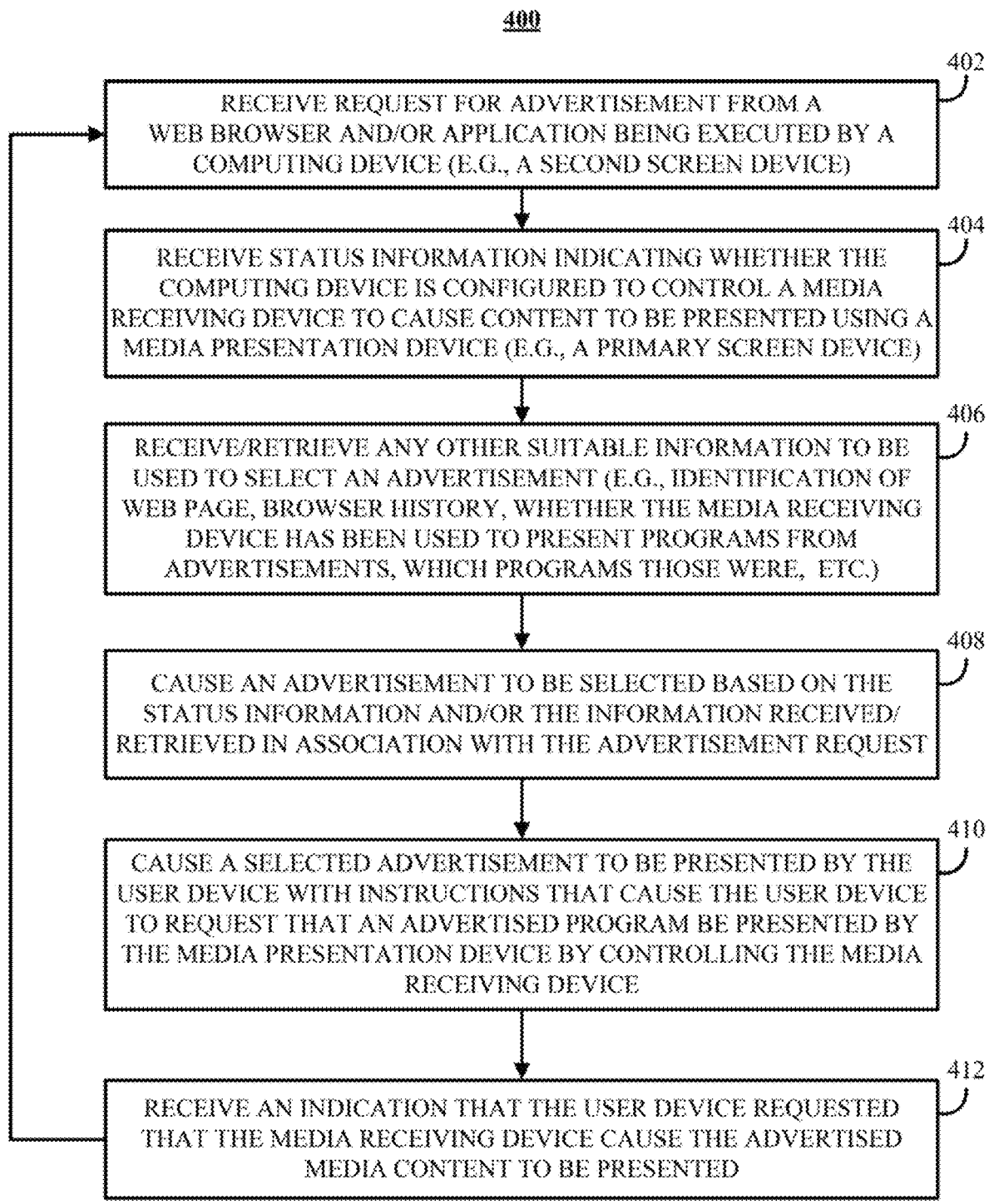
FIG. 4 shows an example of a process for presenting an advertisement for media content on a second screen device and presenting the advertised media content using a primary screen device in accordance with some implementations of the disclosed subject matter.

FIG. 4 shows an example 400 of a process for presenting an advertisement for media content on a second screen device and presenting the advertised media content using a primary screen device in accordance with some implementations of the disclosed subject matter. At 402, process 400 can receive a request for an advertisement from a computing device that is executing a web browser and/or an application that is being used to present content that includes instructions to request an advertisement. In some implementations, such a request can be formatted in any suitable manner and can be received using any suitable technique or combination of techniques. As an example, a web page can include an area that is designated for one or more advertisements. In such an example, this area of the web page can be associated with instructions that cause a web browser that loaded and/or is loading the web page to request an advertisement from an advertisement server that is to be presented using the designated area of the web page. In a more particular example, these instructions can include a uniform resource locator (URL) (and/or any other suitable address information) that the web browser uses to request content from a server (and/or other suitable computing device) associated with the URL. In some implementations, these instructions can also cause the web browser to submit information about the web browser, the web page, the computing device, and/or any other suitable information with a request for content made to the computing device associated with the URL. This information can be used, for example, when an advertisement server performs a process for selecting an advertisement that is to be presented using the designated area of the web page. For example, process 400 can receive a request for an advertisement as an HTTP GET request that includes certain information (e.g., as URL tags included in the GET request) corresponding to the information to be used in selecting an advertisement. Although these examples are described in connection with a browser application loading a web page, an advertisement request can be transmitted from any suitable application and/or using any suitable technique or combination of techniques to request the advertisement. For example, an advertisement request can be transmitted by a computing device that is executing an application for presenting media content that includes instructions that cause the computing device to request an advertisement that is to be presented before, after and/or during presentation of the media content. As another example, an advertisement request can be transmitted by a computing device that is executing a game application that includes instructions that cause the computing device to request an advertisement that is to be presented before, after and/or during game play. As yet another example, an advertisement request can be initiated and/or transmitted when a user submits a query to a search service and/or search engine via a computing device. Such a query can be submitted using any suitable technique or combination of techniques, such as via a web browser loading a web page that includes a search interface for inputting and submitting search queries to the search service, via an application that facilitates inputting and submitting search queries to the search service, via a component of an operating system (e.g., a widget, a built-in application, etc.) of a computing device that facilitates inputting and submitting search queries to the search service, and/or using any other suitable technique of combination of techniques. In a more particular example, if a user enters a search query for a particular episode of a television show, a search advertisement for that episode can be presented with search results, where interest in the search advertisement can initiate presentation of the episode by a media presentation device as described herein.

At 404, process 400 can receive status information indicating whether the computing device associated with the request for the advertisement is configured to control a media receiving device (e.g., media receiving device 102) to cause content to be presented using a media presentation device (e.g., a television) to which the media receiving device is operatively connected (e.g., via an HDMI connection, as a component of the media presentation device, etc.). Although media receiving device 102 is generally described herein as being a separate device, as described above in connection with FIG. 1, media receiving device 102 can be hardware and/or software that is incorporated into the media presentation device. For example, media receiving device can be integrated into a media presentation device 106 as hardware and/or software.

In some implementations, the computing device associated with the request for the advertisement can be configured to control a media receiving device to cause content to be presented using a media presentation device using any suitable technique or combination of techniques. For example, the computing device can execute a browser application that is configured (e.g., using an extension, using built-in capabilities, using another application, etc.) to initiate and/or control presentation of media content using the media receiving device. As another example, the computing device can execute an application for presenting media content (e.g., an application for discovering and/or presenting videos available from a video hosting service) which can be configured to initiate and/or control presentation of media content using the media receiving device. As yet another example, the computing device can execute an application for initiating and/or controlling presentation of media content using the media receiving device, which may be accessible by other applications executed by the computing device.

In some implementations, the status information can include any suitable information related to the configuration of the computing device, a status of the computing device, a status of the media receiving device, a status of the media presentation device, and/or any other suitable status information. For example, as described above, the status information can include information indicating whether the computing device is configured to control the media receiving device. As another example, the status information can include information indicating whether a media receiving device is available in a vicinity of the computing device. A media receiving device can be available when the computing device can control the media receiving device to cause media content to be presented. In some cases, a computing device may be configured to control a media receiving device, but there may not be a media receiving device that is available to be controlled. As yet another example, the status information can include information indicating whether an available media receiving device is currently causing content to be presented. As still another example, the status information can include information indicating whether a media presentation device that an available media receiving device can cause to present media content is in a powered-on state, an input that is currently selected, and/or whether the media receiving device can control a power state and/or an input selection of the media presentation device. As a further example, the status information can include information indicating a channel (e.g., as a channel number, a frequency, a name of the channel, etc.) that is being presented by a media presentation device that an available media receiving device can cause to present media content. In some implementations, prior to including certain personal information (e.g., a power state of the media presentation device, an input selection of the media presentation device, a channel that is being presented by the media presentation device, etc.) in the status, the user is required to affirmatively authorize the inclusion of such information in the status information that can be used to select an advertisement (e.g., as described below in connection with 410). Additionally, in some implementations, some personal information can be generalized or otherwise treated in one or more ways before it is stored or used, so that personal information is removed. For example, a channel can be generalized to a channel name (e.g., rather than a channel number on which the channel is broadcast to the user's equipment). As another example, an input selection of the media presentation device can be generalized such that it does not correspond to the devices and/or input actually present. In a more particular example, if a currently selected input of the media presentation device is coupled to a set-top box this, can be generalized to "set-top box" (or information indicating such) without specifying that the input is "HDMI 1" and specifying the make and/or model of the set-top box. In another more particular example, a currently selected input of the media presentation device is coupled to a media streaming device, this can be generalized to "streaming device" without specifying the actual input that is selected and without specifying the make and/or model of the media streaming device. As yet another more particular example, if a currently selected input of the media presentation device is an input other than the input to which the available media receiving device is coupled, the status can include information indicating this without specifying which input is currently selected and/or a device that is coupled to the currently selected input.

In some implementations, this status information can be received in any suitable format, at any suitable time, and/or as a response to any suitable query from a device (such as a server) executing process 400. Additionally, in some implementations, the status information can be received as part of the request for advertisement and/or in connection with the request for advertisement. In such implementations, the status information can be generated and/or determined using any suitable technique or combination of techniques to be transmitted with and/or in connection with the request for advertisement. For example, the advertisement request can be associated with instructions that cause the browser to determine whether the computing device is configured to control the media receiving device and/or any other suitable information related to the media receiving device. These instructions can cause the browser to include the information related to the configuration of the computing device in the advertisement request.

In a more particular example, instructions that cause the browser to determine whether the computing device is configured to control the media receiving device can determine whether a browser extension associated with the media receiving device is installed on the computing device in association with the browser. As another more particular example, the instructions that cause the browser to determine whether the computing device is configured to control the media receiving device can determine whether an application associated with controlling the media receiving device is installed on the computing device and can be accessed and/or initiated by the browser.

Additionally, in some implementations, the instructions that cause the browser to determine whether the computing device is configured to control the media receiving device can determine whether there is an available media receiving device that the computing device can currently control. For example, a browser extension and/or application for controlling the media receiving device may be installed on the computing device, and the extension and/or application can determine at regular and/or irregular intervals whether there a media receiving device that can be controlled by the computing device is available in the vicinity of the computing device (e.g., by being on the same local network, by communicating using a short range communication protocol such as Bluetooth, by being within range of an audio signal emitted by the media receiving device, etc.). In such an example, the instructions that cause the browser to determine whether the computing device is configured to control the media receiving device can query the extension and/or application for information related to the status of the media receiving device.

In some implementations, instructions that cause the browser (and/or any other suitable application) to determine whether the computing device is configured to control the media receiving device can be provided to the web browser using any suitable technique or combination of techniques. For example, these instructions can be associated with the advertisement request by a publisher of the web page. As another example, these instructions can be included in the instructions that cause the browser to request an advertisement. As yet another example, the instructions that cause the browser to request an advertisement can also redirect to an address that causes the browser to load instructions that cause the browser to determine whether the computing device is configured to control the media receiving device. Additionally or alternatively, in some implementations, instructions that cause the browser (and/or any other suitable application) to determine can be associated with an advertisement that is loaded by the browser (and/or any other suitable application) as described below in connection with 410. In such implementations, the browser (and/or any other suitable application) may or may not make such a determination prior to loading the advertisement.

At 406, process 400 can receive and/or retrieve any suitable information that can be used to select an advertisement. For example, such information can include identifying information of a web page associated with the request for the advertisements. As another example, such information can include information related to a browser history of the computing device. As yet another example, such information can include information related to whether computing device is currently, has recently and/or ever controlled a media receiving device to present content using a media presentation device. In a more particular example, when the computing device is used to control a media presentation device, a browser, browser extension and/or application involved in controlling the media presentation device can update and/or generate information (such as a browser cookie, a pixel tag, etc.) indicating that the computing device was used to control the media presentation device. As still another example, the information that can be used to select an advertisement can include information that identifies a user of the computing device with a group of users that have exhibited similar interests.

As a further example, the information that can be used to select an advertisement can include information that can be used to identify media content that the computing device has caused to be presented using one or more media receiving devices. In a more particular example, information that can be used to identify media content can be stored in a form that is semantically meaningful (e.g., identifying a title of the media content, a source of the media content, etc.) and/or in a form that is not semantically meaningful (e.g., as a code that can be decoded using a particular scheme, as an identifier that can be used to look up information in a database, etc.). This information that can be used to identify media content that was caused to be presented can be stored in a browser cookie, in a cache associated with an application for controlling media receiving devices, and/or in any other suitable manner.

As another further example, the information that can be used to select an advertisement can include identifying information of the computing device and/or a media receiving that is available to the computing device. Any suitable identifying information can be used, and any identifying information that includes personal information can be treated in one or more ways before it is stored or used, so that personal information is removed. For example, such identifying information can be an identifier that is randomly assigned to the computing device and/or media receiving device, and which can be periodically changed. As another example, such identifying information can be an identifier associated with the computing device and/or media receiving device (e.g., such as a MAC address, an IP address, a device ID, etc.) that has been encoded using any suitable technique or combination of techniques to remove personal information. As yet another further example, the information that can be used to select an advertisement can include identifying information of a user of the computing device that has been treated in one or more ways before it is stored or used, so that personal information is removed. For example, a username or email address associated with the user can be encrypted or otherwise encoded such that it is accessible to a particular service provider (e.g., such as a provider of media content streaming services), but that is not easily accessible to others (e.g., using public key-private key encryption).

In some implementations, such information can include user account information associated with the computing device, user account information associated with the media receiving device, user account information associated with the media presentation device, or any other suitable user account information. User account information can be used, for example, to determine subscription information associated with the user account, where subscription information can include services that the user account is currently subscribed to, services that the user account has previous accessed (e.g., but not yet subscribed to), services that the user account may be interested in, services that the user account is likely to subscribe to, an interest type or category of services that the user account has been placed, etc.

In a more particular example, a query that includes user account information can be transmitted to a marketplace or other suitable source that responds with subscription information associated with the user account information. Subscription information can include, for example, applications installed on the computing device relating to one or more media services, applications that have been executed on the computing device within a particular period of time relating to one or more media services, historical information associated with one or more services that the user of the computing device has visited, etc.

In some implementations, user account information or subscription information can be inhibited from being transmitted from the computing device unless specific authorization to use such user account information is received from the user of the computing device. In response to receiving authorization from the user of the computing device to transmit user account information, the user account information can be used to access subscription information and other service-related information from various sources. For example, a query that includes the user account information can be transmitted to a marketplace, where it can be determined which media applications have been downloaded and/or installed on the computing device. In another example, a query that includes the user account information can be transmitted to a marketplace, where it can be determine which media applications are likely to be downloaded and/or installed on the computing device. In yet another example, a query that includes the user account information can be transmitted to determine which services the user of the user account is likely to have an interest based on an interest type or category of service.

It should be noted that user account information can be obtained from various sources. For example, user account information can be received from the computing device. In another example, user account information can be received from the media receiving device or the media playback device. In yet another example, user account information can be obtained from an account service in response to receiving specific authorization from the user of the computing device.

At 408, process 400 can cause an advertisement to be selected based on the status information and/or the information received and/or retrieved in association with the advertisement request. In some implementations, process 400 can cause the advertisement to be selected using any suitable technique or combination of techniques. For example, process 400 can cause an auction to be held in a real-time bidding system for an opportunity to place an advertisement in response to the advertisement request. As another example, process 400 can cause an advertisement to be selected from among advertisements that a publisher of the web page (or other media that is being presented by the second screen device) has agreed to present in certain circumstances. In such examples, process 400 can make any suitable information available to potential advertisers, such as some of the information received and/or retrieved in association with the advertisement request. This information can be used by a publisher, advertising service, and/or potential advertisers to determine whether a particular advertisement placement opportunity is suitable for an advertisement. In some implementations, certain information (e.g., such as whether a media receiving device is available) can be provided only to advertisers that pay a premium for such information (e.g., as subscribers to a premium service, by guaranteeing a higher minimum bid, and/or using any other suitable technique or combination of techniques).

In some implementations, the advertisement can be selected by any suitable user and/or using any suitable computing device, and can be selected using any suitable technique or combination of techniques. For example, in some implementations, the advertisement can be selected through a real-time bidding process based on information associated with the advertisement opportunity (e.g., information related to the web page where the advertisement is to be presented, information about the computing device on which the advertisement is to be presented, etc.) and one or more criteria specified by an advertiser and/or a representative of an advertiser. In such an example, a real-time bidding platform can make information related to the advertisement availability, and advertisers and/or representatives of advertisers can submit bids based on the information related to the advertisement availability. As another example, in some implementations, the advertisement can be selected by a publisher (and/or a representative of the publisher) of the web page from among advertisements that the publisher has previously agreed to present. In such an example, the publisher (and/or a representative of the publisher) can select an advertisement from among the advertisements that the publisher has previously agreed to present based on the information related to the advertising opportunity.

In some implementations, the advertisement can be selected based on the user account information or subscription information. For example, in some implementations, the advertisement can be selected from a subset of advertisements that has been filtered based on those advertisements being associated with content that is provided by a service that the user of the user account has subscribed to. In response to interacting with the selected advertisement, the associated content, from the corresponding service, can be presented on a primary screen device via a media receiving device. In another example, in some implementations, the advertisement can be selected from a subset of advertisements that has been filtered based on those advertisements being associated with content that is provided by one or more services that the user of the user account is likely to subscribe to. In yet another example, in some implementations, the advertisement can be selected based on a received user indication to receive advertisements corresponding to services that the user has subscribed.

Alternatively, in some implementations, an interest type or category of service that the user of the user account has subscribed to or is likely to subscribe to can be determined. For example, in response to determining that the user of the user account has been placed in a particular category based on previous subscription information, particular advertisements can be selected that include prompts to subscribe to a similar or related service (e.g., a service in the same category of services). In another example, in response to determining that the user of the user account has been placed in a particular category based on previous subscription information, particular advertisements can be selected that include the use of a similar or related service (e.g., a service in the same category of services) for a particular duration of time. In yet another example, in response to determining that the user of the user account has been placed in a particular category based on previous subscription information, particular advertisements can be selected for presentation on a second screen device that are associated with media content for presentation on a primary screen device via a media rendering device, where the media content is provided by a similar or related service to the services that the user of the user account has subscribed. In response to presenting the media content from the similar or related service on the primary screen device, a request to the second screen device can be transmitted that the user of the user account subscribe to the service (e.g., by transmitting the user account information to the service that provided the media content).

At 410, process 400 can cause a selected advertisement to be presented by the computing device in association with instructions that cause the computing device to request that a program associated with the advertisement be presented by controlling a media receiving device. In some implementations, process 400 can use any suitable technique or combination of techniques to cause the selected advertisement to be presented. For example, instructions for loading the advertisement can be returned to the computing device that requested the advertisement. As another example, the browser (and/or any other suitable application) can be redirected to an address associated with the advertisement to be presented. As yet another example, the advertisement can be returned to the computing device that requested the advertisement.

In some implementations, the advertisement can be presented using any suitable technique or combination of techniques and can include any suitable content. For example, the advertisement can be presented using text, audio, video, still images, animations, etc., in any suitable combination. As another example, the advertisement can be presented as a banner advertisement, an advertisement presented with search results (e.g., such as a text-based search advertisement), an interstitial advertisement, a pop-up advertisement, a floating advertisement, an expanding advertisement, etc.

In some implementations, in response to selecting the advertisement to be presented, the advertisement can be evaluated to determine whether a subscription prompt should also be presented to the user. For example, in response to determining that a user account associated with a user being presented with an advertisement is not currently subscribed to a service but is likely to subscribe to the service, such as an over-the-top content service, it can be determined that the advertisement should be presented along with a subscription prompt relating to the service. Such a subscription prompt can include a selectable option for downloading a media application corresponding to the service, a selectable option for providing user account information to sign up for the service, a selectable option for using the service for a limited duration (e.g., a trial period of access to content provided by the service), etc. In a more particular example, the subscription prompt can be associated with an application identifier that, in response to selecting the subscription prompt, the application identifier can be transmitted to a marketplace where the corresponding media application is downloaded and/or installed. In another example, in response to determining that a user account associated with a user being presented with an advertisement is not currently subscribed to a service but is likely to subscribe to the service, the subscription prompt to subscribe to the service can be presented—e.g., along with or subsequent to the advertisement presented on the computing device; prior to, during, or subsequent to the presentation of media content corresponding to the advertisement on the media receiving device; between the presentation of the advertisement on the second screen device and the associated content on the primary screen device; between the presentation of a first media content item on a display device and the presentation of a second media content item that is associated with the selected advertisement and that is caused to be presented on the display device by the media receiving device; etc. In yet another example, in response to determining that a user account is currently subscribed to a service, a subscription prompt that transmits user account information to log into the service can be presented along with the advertisement.

It should be noted that the subscription prompt or any other suitable subscription information can be presented at any suitable time. For example, a subscription prompt that requests that the user of the computing device subscribe to a service can be presented concurrently with the advertisement. In another example, a subscription prompt can be presented in an interface during or subsequent to the presentation of the advertisement.

In some implementations, causing the selected advertisement to be presented can include causing information to be presented within and/or in association with the advertisement that can indicate to a user that the user can control a media receiving device via the advertisement to cause the media receiving device to request, receive and/or cause content to be presented. This information can be presented using any suitable technique or combination of techniques. For example, the information can be presented using text, one or more symbols, one or more images, one or more animations, etc., within the advertisement. As another example, the information can presented as text, one or more symbols, one or more images, one or more animations, etc., presented near the advertisement, overlapping the advertisement (e.g., when a user hovers over the advertisement using a cursor of a pointing device), and/or presented in association with the advertisement using any other suitable technique or combination of techniques.

In some implementations, the information that can indicate to a user that the user can control a media receiving device via the advertisement can be presented from any suitable source. For example, the information that can indicate to a user that the user can control a media receiving device via the advertisement can be included in the advertisement as received from the advertiser (and/or a representative of the advertiser). As another example, the information that can indicate to a user that the user can control a media receiving device via the advertisement can be included in the web page and presented to the user in response to a determination that the advertisement includes instructions for controlling a media receiving device. As yet another example, the information that can indicate to a user that the user can control a media receiving device via the advertisement can be requested from a server based on instructions associated with the advertisement and presented in association with the advertisement by the application that requested the advertisement (and/or any other suitable application).

In some implementations, a publisher, an advertiser, a representative of an advertiser and/or any other suitable party can specify how the information that can indicate to a user that the user can control a media receiving device via the advertisement is to be conveyed to users. Additionally or alternatively, one or more standardized and/or customizable templates for the information that can indicate to a user that the user can control a media receiving device via the advertisement can be made available to publishers, advertisers, representatives of advertisers and/or any other suitable parties. For example, the one or more standardized and/or customizable templates for the information that can indicate to a user that the user can control a media receiving device via the advertisement can be made available through a software development kit.

In some implementations, the instructions that cause the computing device to request that a program associated with the advertisement be presented by controlling a media receiving device can be implemented using any suitable technique or combination of techniques. For example, such instructions can interact with a browser application, a browser extension, and/or any other suitable application or instructions, to send a request to a media receiving device to present a particular media content item or items from a particular source. Further examples of such instructions are described below in connection with a sender application and FIG. 8. Additionally, a source and/or identification of the media content item or items can be formatted in any suitable manner and can be delivered using any suitable technique or combination of techniques. For example, the source and/or identification can be formatted as an IP address, a URL, and/or using any other suitable technique or combination of techniques, such as techniques described below in connection with FIG. 9. In some implementations, the source and/or identification of the media content item can be associated with the advertisement (e.g., delivered to the computing device in association with the advertisement), can be accessed from an address associated with the advertisement (e.g., as a redirect from an address associated with the advertisement).

At 412, process 400 can receive an indication that the computing device requested that the media receiving device cause media content associated with the selected advertisement to be presented. Such an indication can be received using any suitable technique or combination of techniques, and can be received in any suitable format. For example, when a computing device requests that the media receiving device cause media content associated with the advertisement to be presented, the request can be communicated to the media receiving device via a computing device executing at least a portion of process 400 (e.g., as an intermediary device). As another example, when a computing device requests that the media receiving device cause media content associated with the advertisement to be presented, instructions associated with the advertisement can cause information indicating that the media content has been requested to be communicated to a computing device executing at least a portion of process 400 (e.g., in situations where the computing device executing at least a portion of process 400 is not involved in submitting a request to the media receiving device). As yet another example, when a computing device requests that the media receiving device cause media content associated with the advertisement to be presented, instructions associated with the advertisement can cause information indicating that the media content has been requested to be stored in a cookie and/or stored using any other suitable technique by the computing device and/or any other suitable computing device. In some implementations, the indication that is received can include information that can be used to identify the media content that was requested, the media receiving device to which the request was submitted, the computing device submitting the request, and/or any other suitable information related to the request. In some implementations, such an indication can be received at a content server that received a request for the content, an advertisement server that served the advertisement, another server that received a request at an address associated with instructions for redirecting a computing device to a content server, and/or at any other suitable computing device that may or may not execute at least a portion of process 400. For example, when a computing device controls a media receiving device to request content, a content server and/or any other suitable server associated with a service provider that delivers the media content requested by the user can record identifying information associated with a user and/or computing device that requested the content. Subsequently, when that computing device and/or another computing device associated with the user requests an advertisement, identifying information associated with the computing device and/or user can indicate to the service provider that the user has previously requested certain media content, but that information may not indicate such to a device executing at least a portion of process 400. Such identifying information is only available to the service provider in situations where the user has signed into the service on the computing device being used to make a request for media content and in situations where the user allows access to such information.

In some implementations, alternatively to presenting the subscription prompt with the selected advertisement, the subscription prompt can be presented along with the media content being presented via the media receiving device. For example, a subscription prompt that requests that the user of the computing device subscribe to the service providing the media content can be presented prior to, during, or after completing the playback of the media content. In another example, a subscription prompt that requests that the user of the computing device subscribe to the service can be presented after presenting a particular number of media content items (e.g., after playing back one media content item, after playing back five media content items, etc.).

In a more particular example, in response to presenting a media content item during a first browsing session (e.g., in which the user selected an advertisement that was presented on a second screen device that caused the media content item to be presented on a primary screen device), retargeting information can be storage such that the user of the primary screen device and/or the second screen device can be presented with an opportunity to subscribe to a service or purchase media content from a service during a subsequent browsing session or at a later time. For example, in response to determining that the user has interacted with an advertisement being presented on a second screen device during a browsing session and in response to presenting the associated media content on a primary screen device, retargeting information corresponding to such presentations can be used to present the user with a subsequent opportunity to subscribe to the service that presented the media content. In another example, retargeting information indicating that the user selected an advertisement presented on the second screen device and consumed the media content corresponding to the selected advertisement on the primary screen device can be stored, where, at a later time such as a subsequent browsing session on the second screen device, the user can be prompted to subscribe to a service that provided the media content or an opportunity to purchase additional media content (e.g., the next episode) from a service that provided the media content based on the retargeting information. In yet another example, retargeting information indicating that the user selected an advertisement presented on the second screen device and consumed the media content corresponding to the selected advertisement on the primary screen device can be stored, where, at a later time such as a subsequent browsing session on the second screen device, the user can be prompted to purchase a group of media content items. In a further example, retargeting information indicating that the user selected an advertisement presented on the second screen device and consumed the media content corresponding to the selected advertisement on the primary screen device can be provided to advertisers, where, at a later time such as a subsequent browsing session on the second screen device, the user can be provided with advertisements corresponding to related media content items.

In some implementations, in response to selecting or otherwise interacting with the subscription prompt, the user of the computing device can subscribe to the associated service. For example, in response to selecting the subscription prompt, an application identifier associated with the subscription prompt can be transmitted to a marketplace, where a media application corresponding to the service can be downloaded and/or installed on the computing device. In another example, the user of the computing device can be prompted to provide payment information and/or other suitable user information to initiate the service. In yet another example, in response to selecting the subscription prompt, the user account can be transmitted to subscribe to the service. In this example, the user of the computing device can be prompted to input a username and a password for accessing the service.

Figure 5:
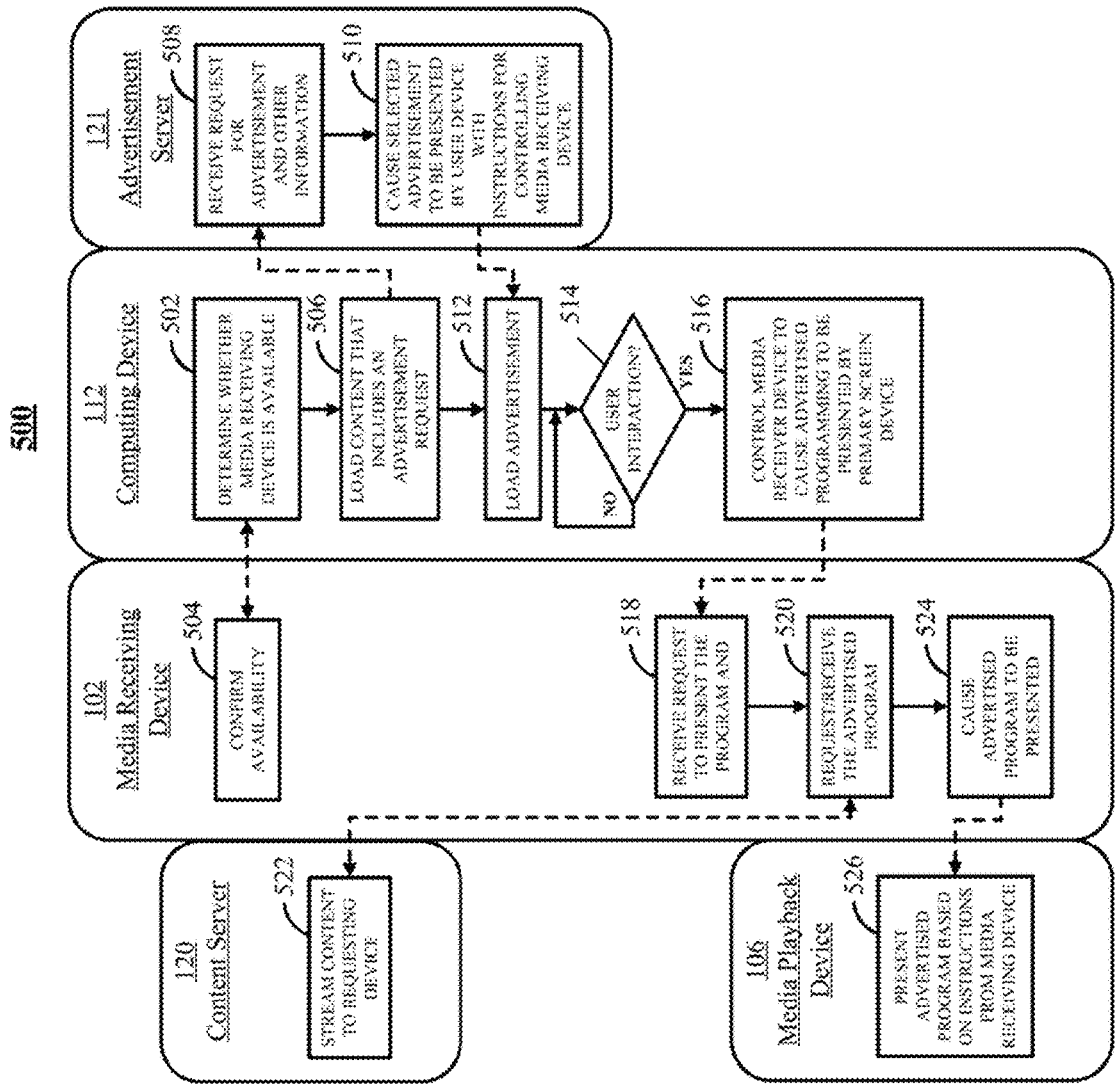
FIG. 5 shows an example of a data flow that can be used in conjunction with the processes described above in connection with FIG. 4 to present media content that was advertised on a second screen device using a primary screen device in accordance with some implementations of the disclosed subject matter.

FIG. 5 shows an example of a data flow 500 that can be used in conjunction with the processes described above in connection with FIG. 4 to present media content that was advertised on a second screen device using a primary screen device in accordance with some implementations of the disclosed subject matter. At 502, computing device 112 can determine whether a media receiving device (such as media receiving device 102) is available in a vicinity of computing device 112 for causing content to be presented by a media playback device (such as media playback device 106). Note that, as described above, a media receiving device can be incorporated into a media playback device as hardware and/or software.

Computing device 112 can use any suitable technique or combination of techniques to determine whether a media receiving device is available, which can be initiated by any suitable application or process of computing device 112, such as techniques described above in connection with 404 of FIG. 4. In some implementations, computing device can determine whether a media receiving device is available at any suitable time or times such as in response to powering on, in response to opening a particular application or applications, in response to presenting media content, in response to instructions executed by a particular application and/or processes (e.g., instructions associated with an advertising opportunity as described above in connection with 404 of FIG. 4).

At 504, media receiving device 102 can confirm that media receiving device 102 is available using any suitable technique or combination of techniques. For example, media receiving device 102 can respond to a request from computing device 112 (and/or any other suitable computing device) indicating that media receiving device 102 is available. As another example, media receiving device 102 can communicate information indicating its availability to be used by computing devices without first receiving a request from a computing device 112. In some implementations, media receiving device 102 can communicate information to computing devices 112 over any suitable network or combination of networks such as a wireless local area network, a peer-to-peer connection (e.g., Bluetooth), using sound to communicate through the air, and/or using any other suitable technique or combination of techniques to communicate with computing devices.

At 506, computing device 112 can load content that includes instructions that cause computing device to request an advertisement. Such instructions can be in any suitable format and can be included in any suitable content. For example, the instructions that cause the advertisement to be requested can be included in a web page. As another example, the instructions that cause the advertisement to be requested can be loaded by an application that is being executed by computing device 112 to present content other than a web page (e.g., media content, search results, a video game, etc.). Additionally, in some implementations, a request can be formatted in any suitable manner, and can be sent to any suitable address and/or device. For example, as shown in FIG. 5, the request for an advertisement can be transmitted to advertisement server 121. As another example, the request for an advertisement can be transmitted to an intermediary device and/or advertisement server 121 can include any suitable combination of devices, parties and/or platforms, such as a server associated with the publisher of the content, a supply side platform, a real-time bidding platform, etc.

At 508, advertisement server 121 can receive a request for an advertisement and/or any other suitable information. As described above in connection with 402 of FIG. 4 and/or 506 of FIG. 5, the request can be in any suitable format and/or can be transmitted via any suitable number of intermediary devices. Additionally, as described above in connection with 404 of FIG. 4, the request can be associated with any suitable information related to computing device 112 and/or media receiving device 102, such as information related to the availability and/or use of a media receiving device (e.g., such as media receiving device 102 shown in FIG. 5). In some implementations, as described above, the request can be associated with subscription information associated with a user account of the computing device.

At 510, advertisement server 121 can cause a selected advertisement to be presented by the computing device, where the selected advertisement can be associated with instructions for controlling a media receiving device. As described above in connection with 408 of FIG. 4, the selected advertisement can be selected in any suitable manner and using any suitable technique or combination of techniques. Additionally, advertisement server 121 can cause the advertisement to be presented using any suitable technique or combination of techniques. For example, advertisement server 121 can cause the advertisement to be presented by responding to the advertisement request with an address that is to be used by computing device 112 to request the selected advertisement (e.g., from an advertisement creative server). In such an example, advertisement server 121 can be a computing device that selected the advertisement and/or a source for the advertisement, and accordingly identified an address for the advertisement and/or a source for the advertisement. Alternatively, advertisement server 121 can receive an address for the advertisement and/or source of the selected advertisement from another computing device (e.g., a real-time bidding server).

As another example, advertisement server 121 can cause the advertisement to be presented by causing the address to be transmitted to computing device 112 by another computing device. In a more particular example, advertisement server 121 can cause computing device 112 to request the address from another computing device by returning the address for that computing device, which can, in turn, cause the address for the advertisement to be returned to computing device 112. In another more particular example, advertisement server 121 can cause another device to push the address of the selected advertisement and/or source of the selected advertisement to computing device 112.

As yet another example, advertisement server 121 can cause the selected advertisement to be presented by computing device 112 by providing the advertisement to computing device 112 in response to the request for an advertisement.

As a further example, advertisement server 121 or any other suitable server can select an advertisement to be presented by computing device 112 based on subscription information. For example, in response to obtaining subscription information that indicates the user of computing device 112 is subscribed to one or more services, advertisement server 121 or any other suitable server can select an advertisement that corresponds to media content provided by the subscribed services, one or more services that are similar to the subscribed services, one or more services that the user of computing device 112 would be deemed as likely to subscribe to based on the subscribed services, etc. In another example, advertisement server 121 or any other suitable server can select an advertisement and then determine whether a subscription prompt or any other suitable subscription request should be presented to the user along with the advertisement.

At 512, computing device 112 can load the selected advertisement using any suitable technique or combination of techniques. As described above, the selected advertisement can be provided by any suitable computing device and can include any suitable image or images, video, text, animation, etc. As also described above, the selected advertisement can be associated with instructions that can be executed to cause computing device 112 to control media device 102 to present content from a designated source. For example, the selected advertisement can be an advertisement for a particular item of media content, and the instructions can be executed to cause computing device 112 to control that media receiving device 102 (and/or any other suitable media receiving device) to request that media content item from the designated source. Note that although the media content that is to be presented is described as corresponding to an advertised media content item, the source of the media content that is to be requested may not correspond to the advertised media content either through error or malice. In some implementations, prior to causing the media content to be presented (e.g., as described below in connection with 516), identifying information of the media content, a verification of the source of the media content, and/or a preview of the media content can be presented by computing device 112.

In some implementations, the instructions that cause computing device 112 to request that media receiving device 102 present the advertised content can be executed in response to any suitable interaction by a user. For example, as described above, such instructions can be executed in response to a user hovering a cursor over the advertisement and/or selecting the advertisement (e.g., by clicking/double using a pointing device, by touching a location on a touch screen corresponding to the advertisement, by starting a particular gesture using a touchscreen from a location on the touchscreen corresponding to the advertisement, by speaking a command that is recognized by a voice recognition process, by detecting that a user's eye-gaze has lingered on the advertisement for a predetermined amount of time, etc.). As another example, a first interaction (such as described in the previous example) can cause computing device to query a user to determine whether the user would like to control media receiving device 102 (and/or any other suitable media receiving device) to present the advertised content. In some implementations, a source of the media content and/or identifying information of the media content can be included associated with the advertisement and/or can be accessed at an address associated with the advertisement (e.g., a redirect address), for example as described above in connection with 410 of FIG. 4.

At 514, computing device 112 can determine whether a user interaction (e.g., as described above in connection with 512) has been received that initiates computing device 112 to execute the instructions to control media receiving device 102 to present the advertised content. If such a user interaction has not been received ("NO" at 514), computing device 112 can continue to determine whether the user interaction has been received until any suitable condition is satisfied (e.g., the selected advertisement is replaced, the selected advertisement is navigated off a screen of computing device 112, computing device 112 navigates away from the web page that includes the selected advertisement, etc.).

Otherwise, if such a user interaction has been received ("YES" at 514), computing device 112 can proceed to 516 and can control media receiving device 102 to cause the media content associated with the instructions to be presented by a presentation device coupled to media receiving device 102. Computing device 112 can use any suitable technique or combination of techniques to request that media receiving device 102 present the media content associated with the selected advertisement. For example, computing device 112 can use one or more techniques described below in connection with FIGS. 8-14E.

In some implementations, computing device 112 can execute any suitable instructions to control presentation of the media content by media receiving device (e.g., to stop, pause, rewind, fast forward, control volume, etc.). For example, computing device techniques described below in connection with FIGS. 8-14E. In such implementations, a user interface for presenting controls can be presented using any suitable technique or combination of techniques. For example, the user interface can be presented within the selected advertisement as presented by computing device 112. As another example, the user interface can be presented in a pop-up window presented by computing device 112. As yet another example, the user interface can be presented in a separate portion of a window that is used to present a web page (and/or any other suitable content that is being presented by computing device 112). As still another example, the user interface can be presented using a mobile notification that can be accessed through a notification manager of a mobile device.

At 518, media receiving device 102 can receive a request to present the media content associated with the advertisement. As described below in connection with FIGS. 8 and 9, such a request can be received using any suitable technique or combination of techniques and can be received from any suitable computing device. For example, the request can be received over a wireless local area network from computing device 112. As another example, the request can be received over a short-range wireless protocol (e.g., Bluetooth) from computing device 112. As yet another example, the request can be received over the Internet and/or over a local area network from a server that is located remotely from computing device 112 and/or media receiving device 102.

At 520, media receiving device 102 can request and/or receive the media content associated with the advertisement in response to the request received at 518. As described below in connection with FIG. 9, media receiving device 102 can request and/or receive the media content using any suitable technique or combination of techniques. Additionally, media receiving device 102 can request and/or receive the media content from any suitable source (e.g., such as a source identified by computing device 112). In some implementations, a user can be required to sign in to a service associated with the source of the media content (e.g., where the media content is only available to subscribers and/or account holders) prior to requesting and/or receiving the media content at 520. A user interface for signing in to the service can be provided, for example, on the computing device 112 through the advertisement, through a pop-up window, and/or using any other suitable technique or combination of techniques. Additionally or alternatively, in some implementations, a user can pay for a service associated with the source of the media content and/or can pay for (and/or authorize payment for) the media content prior to requesting and/or receiving the media content at 520. Such payment and/or authorization can be performed using any suitable user interface (presented, for example, by computing device 112) and/or payment service which can be provided using any suitable techniques. For example, a user interface for entering payment information (e.g., a credit card number, a username and password of a payment service, etc.) can be presented to a user. As another example, a user interface for a payment application (e.g., a mobile wallet, a payment service associated with the computing device, etc.) can prompt a user to authorize the payment and/or can require any suitable authentication procedure associated with the authorization.

In some implementations, media receiving device 102 can determine whether a subscription prompt or any other suitable subscription-related action should be presented with the media content associated with the selected advertisement. For example, in response to determining that the user of the user account has an interest in subscribing to a service providing the presented media content, a subscription prompt can be presented prior to, concurrently with, and subsequently to presenting the media content that prompts the user to subscribe to the service. In another example, in response to determining that the user of the user account has subscribed to the service associated with the presented media content, an authentication prompt can be presented to sign into the service. In yet another example, in response to determining that the user of the user account has subscribed to the service associated with the media content corresponding to the selected advertisement, user account information can be transmitted to the service, thereby signing into the service and associating the playback of the media content with the user account. In a further example, in response to determining that the user of the user account has been placed in an interest group that is likely to subscribe to the service that is providing the media content, an instruction can be transmitted to media receiving device 102 that permits media receiving device 102 to access the corresponding service for a particular period of time (e.g., one playback of a media content item provided by the service without providing payment information or subscription information).

At 522, content server 120 can stream content to the requesting media receiving device (e.g., media receiving device 102) in response to the request for content. In some implementations, content server 120 can determine whether the requesting device is an authorized device, and can perform any other suitable actions prior to streaming the media content to the requesting device. Content server 120 can use any suitable technique or combination of techniques to stream the content to the requesting device. Additionally, in some implementations, content server 120 can make the requested media content available for download by the requesting device in addition to, or in lieu of, making the content available for streaming by the requesting device.

At 524, media receiving device 102 can cause the media content received from content server 120 to be presented by a media playback device (e.g., media playback device 106). Media receiving 102 device can cause the media content to be presented using any suitable technique or combination of techniques. For example, media receiving device 102 can provide the media content on one or more outputs such as an HDMI output, a USB output, a component cable output, an RCA output, an S-Video output, etc. As another example, media receiving device 102 can cause media presentation device 106 to switch its input to an input associated with media receiving device 102, such as by using HDMI consumer electronic control (CEC) signals to cause media presentation device 106 to switch its input to an HDMI input port to which media receiving device 102 is operatively connected (either directly or indirectly).

Although examples described herein are generally directed to media receiving device 102 receiving media content and causing the content to be presented by a media presentation device, the media content can be available from another source. For example, the media content may be media content that is currently being broadcast over-the-air, through a set-top box associated with the user, and/or using any other suitable technique or combination of techniques. In such an example, in lieu of media receiving device requesting and/or receiving the media content at 520, media receiving device 102 and/or computing device 112 can control media playback device 106 (and/or any other suitable device) to present the media content (e.g., by tuning to a channel on which the content is being broadcast). Media receiving device 102 can use any suitable technique or combination of techniques to control media playback device, such as by sending a message over a CEC bus, sending a message using an infrared or radio transmitter to change the channel of media playback device 106 to a channel associated with the media content. Additionally, in some implementations, computing device 112 can transmit a message to media playback device 106 (e.g., using an infrared transmitter, a radio transmitter, etc.) to change the channel of media playback device 106 to a channel associated with the media content. Additionally or alternatively, in some implementations, upon interaction with the advertisement at 514, instructions associated with the advertisement can cause computing device 112 can prompt the user to control media playback device to change the channel to a channel associated with the media playback device (e.g., using a remote control or application associated with media playback device 106).

In some implementations, where a media receiving device 102 is not available, in response to user interaction at 514 (and/or at any other suitable time), instructions associated with the advertisement can cause computing device 112 to inform the user (e.g., through a notification or other informational message) that if a media receiving device were available, the user could cause the media content associated with the advertisement to be presented. Additionally, in some implementations, instructions associated with the advertisement can cause computing device 112 to present the user with an opportunity to purchase a media receiving device.

At 526, media playback device 106 can present the media content that is associated with the advertisement based on instructions and/or media content received from media receiving device 102. Media playback device 106 can use any suitable technique or combination of techniques to present the media content.

FIG. 6 shows an example of a computing device being used to present an advertisement that can be selected (and/or otherwise interacted with) to cause advertised media content to be presented by a media receiving device and/or media presentation device in accordance with some implementations of the disclosed subject matter. As shown in FIG. 6, computing device 112 (which is a mobile computing device in this example, such as a smartphone) is presenting a web page that includes an advertisement 602. In accordance with some implementations, a user can select advertisement 602 using a touchscreen of computing device 112. Upon selecting (and/or otherwise interacting with) advertisement 602, computing device 112 can be instructed to request that media content associated with advertisement 602 be presented using media receiving device 102 and/or media presentation device 106 as described above in connection with process 400 of FIG. 4.

Figure 7:
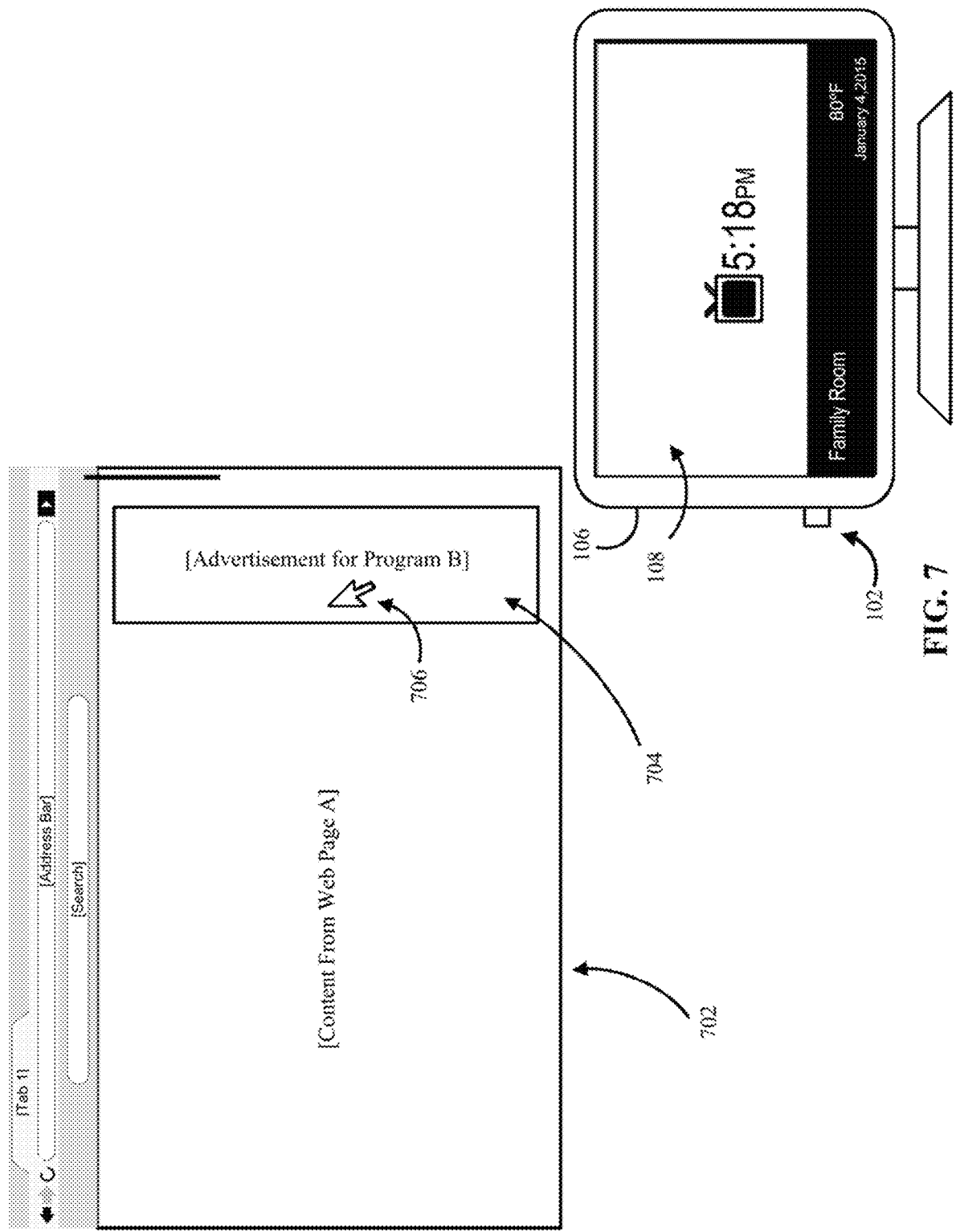
FIG. 7 shows an example of a browser being used by a computing device to present an advertisement that can be interacted with to cause advertised media content to be presented by a media receiving device and/or media presentation device in accordance with some implementations of the disclosed subject matter.

FIG. 7 shows an example of a browser window being used by a computing device to present an advertisement that can be interacted with to cause advertised media content to be presented by a media receiving device and/or media presentation device in accordance with some implementations of the disclosed subject matter. As shown in FIG. 7, a browser window 702 (which can be presented by, for example, a personal computer executing a browser application) is presenting a web page that includes an advertisement 704. In accordance with some implementations, a user can position a cursor 706 at a location within browser window 702 that is associated with advertisement 704. In response to cursor 706 hovering over a location within browser 702 associated with advertisement 704 and/or in response to a user selecting the advertisement (e.g., by "clicking on" a location within browser 702 associated with advertisement 704), the computing device executing the browser can be instructed to request that media content associated with advertisement 704 be presented using media receiving device 102 and/or media presentation device 106 as described above in connection with process 400 of FIG. 4.

Figure 8:
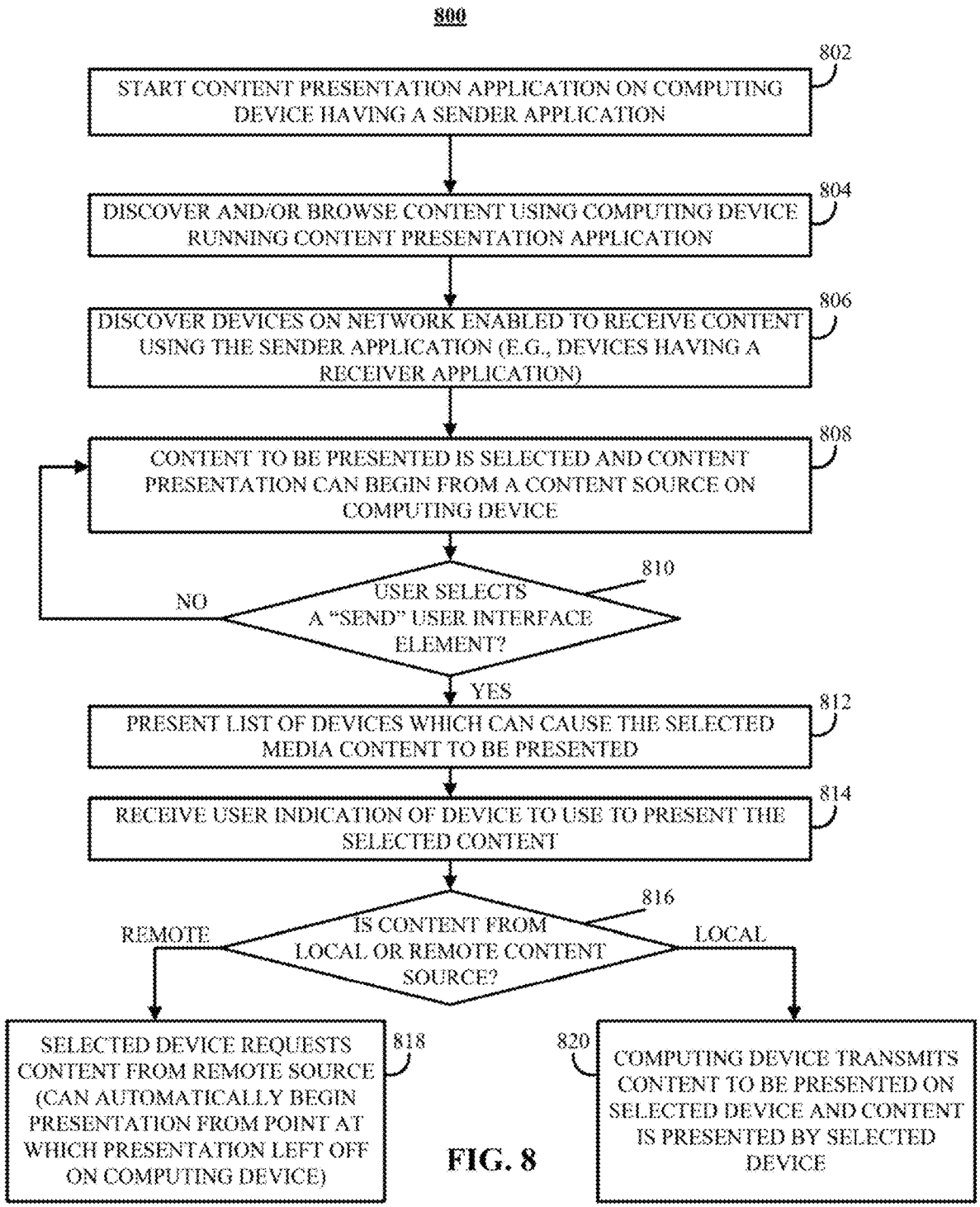
FIG. 8 shows an example of a process for presenting media content in accordance with some implementations of the disclosed subject matter.

FIG. 8 shows an example 800 of a process for presenting media content in accordance with some implementations of the disclosed subject matter. At 802, a content presentation application can be started on a computing device having a sender application. The content presentation application can include any suitable content presentation functions, such as discovering and/or browsing content to be presented, software to enable rendering and/or presentation of content such as video and/or audio content (which can include still images).

In some implementations, a sender application can be incorporated as part of the content presentation application and/or as a separate application that can be executed by an operating system of the computing device running the content presentation application (e.g., computing device 112). In some implementations, the sender application can be an application programming interface (API) for communication with a receiver application, for example, as described below. Such a sender application can be configured to receive commands from a computing device, such as computing device 112, and send these commands to a media receiving device (e.g., media receiving device 102). Among other things, the sender application can instruct a computing device to perform the following functions: cause a computing device running the application to discover the presence of media receiving devices (e.g., media receiving devices 102 on a home network, or the like); receive a selection of a media receiving device with which the computing device running the sender application is to communicate; and establish one or more communication channels with the selected media receiving device to be able to send and/or receive communications.

In some implementations, the sender application can include a set of standard software instructions, such as one or more portions of a software developer kit (SDK) (e.g., a Content Sender SDK) for performing, among other things, the above functions. The sender application can, for example, expose certain controls of a media receiving device (such as media receiving device 102), such as play, pause, stop, and volume control. Additionally, the sender application can periodically receive status updates from the media receiving device regarding, e.g., whether a media content item is being played, an identity of the media content item, a time of the media content item, etc.

In some implementations, the sender application can start in response to the computing device starting the content presentation application. Alternatively, the sender application can start when the computing device is started and run as a background application, or start in response to a user selecting an icon that corresponds to a function for using the sender application to present media content on a media receiving device.

At 804, the content presentation application can discover and/or browse content using the computing device running the content presentation application. For example, the content presentation application can be an application for a video sharing service that allows a user of the application to view videos uploaded by users of the video sharing service. Such a content presentation application can allow a user of the application to discover videos to watch using search functions, recommendations, curated lists, channels, randomly, or any other suitable techniques for facilitating discovery and/or browsing of content by a user. As another example, the content presentation application can be a Web browser that can, among other things, allow a user to discover and/or browse Web pages.

At 806, the sender application can cause the computing device running the sender application to discover media receiving devices (e.g., media receiving device 102) that are present on a network that the computing device is connected to (e.g., a home network). Any suitable technique(s) can be used to discover devices, such as multicasting a message to a particular address on the network, and launching an event listener to listen for replies from devices on the network that received the multicast message. Additionally, in some implementations, an event listener associated with the device executing process 800 can listen for messages sent from a media receiving device (e.g., media receiving device 102) that may not be a response to a multicast message previously sent by such a device. Such a message can be a broadcast, multicast, or unicast message sent by the media receiving device. In some implementations, the sender application can start and discover devices at 206 in response to the computing device launching the content presentation application and/or starting the sender application, in response to a user selecting a "send" icon as described below in connection with 810, periodically, or at any other suitable time.

At 808, the content presentation application can receive a user indication of a media content item to be presented, and presentation of the media content item can begin on the computing device running the content presentation application. Additionally or alternatively, the selected media content item may not be presented on the computing device upon selection, but instead the content presentation application can wait for a user instruction to present the media content item.

At 810, the content presentation application and/or the sender application can determine whether a user has selected a "send" icon (or any other suitable indication to send the media content item to a media receiving device, such as a voice command, entering a text command, etc.) to send the selected media content item to a media receiving device (e.g., media receiving device 102). A determination of whether the user has selected the "send" icon can be made using any suitable technique, for example by receiving a signal from the computing device running the content presentation application indicating that a user selection of the "send" icon has been received. If the content presentation application and/or sender application determines that a user selection of the "send" icon has not been received ("NO" at 810), process 800 can return to 808 and continue to present the selected media content item (if being presented). Otherwise, if the content presentation application and/or sender application determines that a user selection of the "send" icon has been received ("YES" at 810), process 800 can proceed to 812.

At 812, the sender application can cause the computing device running the sender application to present a list of media receiver devices which can cause the selected media content item to be presented. A list of media receiving devices (e.g., including media receiving device 102) can be created based on the media receiving devices that were discovered at 806. In some implementations, devices that have previously been used to present media content items using the sender application can be included in the list regardless of whether the device responded to the discovery request at 806. For example, devices that have previously been used can be presented to the user in the list of devices with an indication that the device was not discovered (e.g., the device is offline or not in the network). In some implementations, presenting the list of devices to the user can be omitted, for example, if the user has previously chosen a default media receiving device to use to present content, and/or if only one media receiving device is detected during device discovery at 806. In some implementations, device discovery at 806 can be performed in parallel with presentation of content at 808, in response to selection of "send" user interface element at 810 (e.g., in response to "YES" at 810), and/or at any other suitable time.

At 814, the sender application can receive an indication of a media receiving device to use to present the content selected at 208. For example, the sender application can receive a signal from the computing device running the sender application of a device that was selected by the user as the media receiving device to use to present the media content item selected at 808.

In some implementations, a communication session between the computing device running the sender application and the selected media receiving device can be initiated in response to receiving the selection of the media device at 814. Initiation of the session can cause a secure connection to be created between the communication device running the sender application and the selected media receiving device running the receiver application. This session can include sending a call to the selected media receiving device over the network and launching an application for causing the media content item selected at 808 to be presented using the selected media receiving device.

In some implementations, initiating the session can further include launching a listener for receiving communications from a receiver application running on the selected media receiving device. After the session is initiated, a channel can be created for communication directly between the sender application running on the computing device running the content presentation application and the receiver application (described below in connection with FIG. 9) running on the selected media receiving device. This channel can be used to send commands from the computing device running the sender application to the selected media receiver application running the receiver application, such as a command to present a selected media content item, a command to play the media content item, a command to pause the media content item, etc. A computing device running the sender application and a media receiving device are sometimes referred to herein as being paired devices when a channel has been established between them as described above. Additionally or alternatively, in some implementations, the sender application can send any suitable commands and/or instructions, such as commands and/or instructions to present particular content (e.g., content that is selected at 208) over the channel described above and/or using a non-persistent connection. For example, commands and/or instructions can be sent over a non-persistent connection by sending a request to the media receiving device using a transient channel (e.g., communicating using Hypertext Transfer Protocol messages addressed to the media receiving device). In some implementations, certain commands and/or instructions can be sent using a non-persistent connection during an initialization period of the media receiving device and/or when a receiver application of the media receiving device is launching, prior to the persistent connection being established, during initialization of the persistent communication channel, and/or at any other suitable timing.

In some implementations, when a channel is created between the computing device running the sender application and a media receiver device, the sender application can send instructions to launch a content streaming application that corresponds to the content presentation application that was used for discovering and/or browsing content at 804 and/or selecting content at 808.

At 816, the sender application can determine whether the source of the media content item is local (e.g., on the computing device running the sender application) or remote (e.g., on a content delivery server, on a network attached storage, on a personal computer on the network, etc.). If the sender application determines that the source of the media content item is remote ("REMOTE" at 816), process 800 can proceed to 818.

At 818, the sender application can cause the selected media receiving device to request the content item from the remote source from which the content item is available (e.g., a remote server, network attached storage, etc.) using any suitable communication protocols such as hypertext transfer protocol (HTTP), any suitable streaming protocol, file transfer protocol (FTP), protocols corresponding to Digital Living Network Alliance (DLNA) standards, or any other suitable protocol. In some implementations, if the media content item was presented by the computing device running the content presentation application the media receiver application can cause the media content item to be presented where the computing device left off presenting the media content item.

Otherwise, if the sender application determines that the source of the media content item is local ("LOCAL" at 816), process 800 can proceed to 820.

At 820, the sender application can cause the computing device running the content presentation application to transmit the content to the selected media receiving device over the network. The sender application can then cause the selected media receiving device to present the content, using a channel established between the computing device running the sender application and the selected media receiver device. In some implementations, a channel for sending the content from the device executing process 800 (e.g., computing device 112) to the selected media receiving device (e.g., media receiving device 112) can be a separate channel than a channel for sending commands and/or instructions to media receiving device 112. For example, a channel for sending commands and/or instructions can be a control channel, and a channel for sending content can be a data channel. Alternatively, content can be sent over the same channel as commands and/or instructions.

It should be noted that, in some implementations, the sender application and/or the content presentation application can control the presentation of the media content item by the selected media receiving device. For example, the sender application can include a remote control capability that, in response to selecting an advertisement associated with media content on the computing device running the content presentation application, the sender application can be used to control the media content item being played back on the primary display device. In continuing this example, the sender application executing on a computing device can present a user interface on a second display device connected to the computing device that allows the user to provide instructions for controlling the media content item being presented on the primary display device via the selected media receiving device. In some implementations, the sender application can also determine whether to provide a subscription prompt associated with the service that provides the media content item to the user on the primary screen device and/or the second screen device.

In some implementations, the media content item can include a Web page or portion of a Web page being rendered by computing device 112. In such implementations, the Web page can be considered to be a locally stored media content item and can be transmitted directly from computing device 112 to media receiver 102 (e.g., over a network such as a home network) as a video object (e.g., the Web page can be rendered by computing device 112 and a video corresponding to the content can be transmitted to media receiver 102). Alternatively, the Web page can be considered to be a remote media content item and can be requested by media receiving device 102 and rendered using, for example, a web browser application launched by media receiving device 102.

Figure 9:
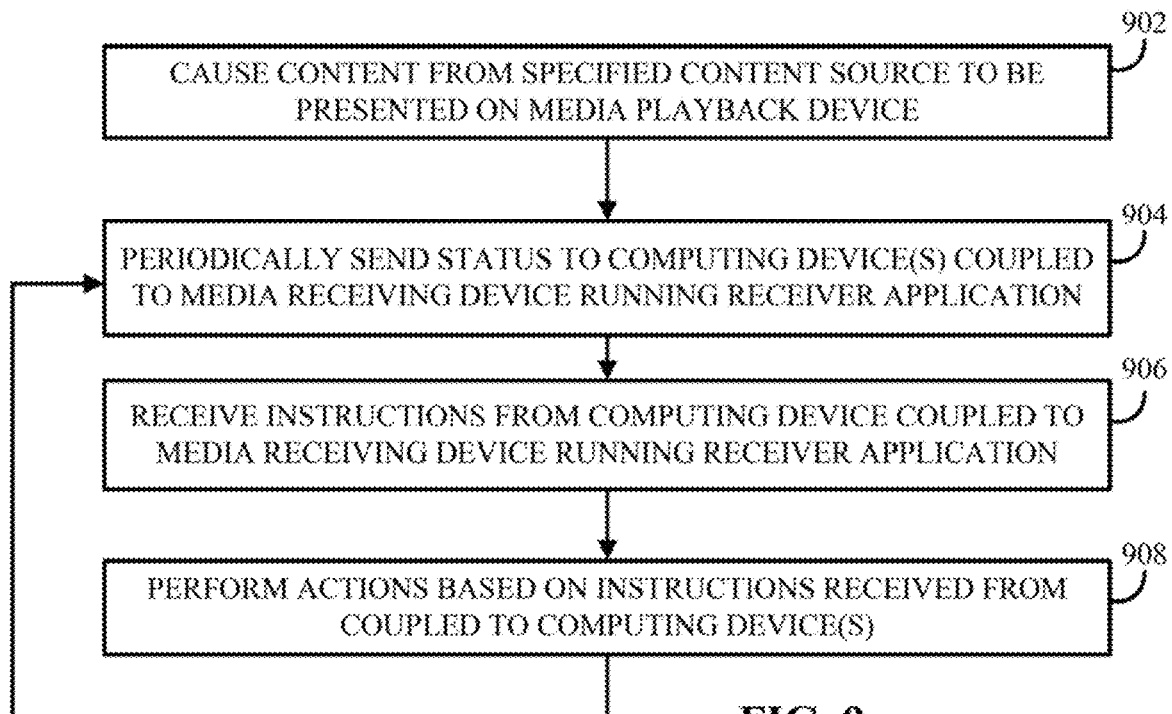
FIG. 9 shows an example of a process for receiving and presenting media content using a media receiving device in accordance with some implementations of the disclosed subject matter.

FIG. 9 shows an example 900 of a process for receiving and presenting media content using a media receiving device running a receiver application. As described above, a media receiving device (e.g., media receiving device 102) can run a receiver application for receiving requests and commands from computing devices that are running a sender application. When a discovery request is received from a sender application, the receiver application can cause the media receiving device to respond to the discovery request and establish a control and/or data channel with the computing device that sent the discovery request in response to the sender application indicating that a channel is to be established.

In some implementations, the receiver application can be an application programming interface (API) for communication with the sender application as described above. Such a receiver application can be executed by a media receiving device (e.g., media receiving device 102) to receive commands from a sender application running on a computing device, such as computing device 112. Among other things, the receiver application can perform the following functions: respond to discovery requests sent by a computing device running the sender application; establish one or more communication channels with the computing device to be able to send and/or receive communications; download and/or launch a streaming application for presenting content; and relay instructions received over the one or more communication channels to a streaming application being used by the media receiving device to present a media content item.

In some implementations, the receiver application can include a set of standard software instructions, such as one or more portions of a software developer kit (SDK) (e.g., a Content Receiver SDK) for performing the above functions. The receiver application can, for example, launch a listener for receiving discovery requests from computing devices (e.g., computing device 112) running the sender application, create a persistent connection with the computing device for sending and receiving commands and/or messages, download and render a streaming application, receive commands from the computing device running the sender application, and relay the command to the streaming application (e.g., in a default format or in a format particular to the source of content associated with the streaming application). Additionally, the receiver application can periodically send status updates from the media receiving device regarding, e.g., whether a media content item is being played, an identity of the media content item, a time of the media content item, etc. In some implementations, commands specific to a particular content presentation application and/or content streaming application can be sent and/or received by the receiver application. Such application specific commands can be relayed from the content presentation application to the streaming application via the sender application and receiving application, and vice versa. For example, a streaming application that requires an authentication token to receive and present a media content item can request such an authentication token from the content presentation application through the receiver application and the sender application.

In some implementations, the receiver application can start in response to the media receiving device being initiated (e.g., powering on). Additionally, the receiver application can run as a background application and/or start in response to a listener application running on the media receiving device receiving a discovery request from a sender application.

In some implementations, the media receiving device running the receiver application can receive instructions to launch a content streaming application that corresponds to the content presentation application running on the computing device running the sender application. Such instructions can include address information (e.g., a URI, a URL, a URN, an IP address, and/or any other suitable address information) where the content streaming application can be downloaded, software corresponding to the content streaming application, an indication of a pre-installed content streaming application to launch, or any other suitable instructions to launch the content streaming application.

In some implementations, the receiver application can cause the media receiving device to download the content streaming application from the received address. The content streaming application can then be rendered by the media receiving application in order to render a content item (e.g., a content item selected at 208). The content streaming application can include any suitable software for causing the media receiving device to present a content item on a connected media playback device. For example, the streaming application can include hypertext markup language (HTML), JavaScript (JS), or any other suitable programming language.

In some implementations, when the receiver application launches a content streaming application, the receiver application can cause an application context to be created. For example, an application context identified as "Fling" can be created as an origin for messages to be received from the receiver application by the content streaming application. In some implementations, when a content streaming application is done being rendered, the receiver application can set any suitable target for commands that are received from the sender application. For example, the receiver application can set a video tag of the content streaming application as a target for commands that are received from the sender application. As another example, the receiver application can set a video element of the content streaming application as a target for commands that are received from the sender application. These commands can then be executed by the media receiving device upon receiving the command from a sender application. Additionally or alternatively, a destination for commands received from the sender can be set to a particular event handler, which can receive the commands and determine how to properly respond to the received command.

At 902, the media receiving device running the receiver application (e.g., media receiving device 102) can cause content specified by a sender application to be presented on a media playback device (e.g., media playback device 106) after a streaming application has been launched. The content can be requested from a particular address specified by the sender application and/or can be received from the computing device running the sender application.

At 904, the media receiving device running the receiver application can periodically send a status to any computing devices with which a channel has been established. Such a status can include, for example, a play/pause state, a completion percentage of the media content item, metadata related to the media content item being presented, and/or any other suitable information.

At 906, the media receiving device running the receiver application can receive instructions from computing devices that are coupled to the media receiving application. For example, instructions can include a play command, a pause command, a volume command, etc.

At 908, the media receiving device running the receiver application can perform actions based on instructions received from a coupled device. For example, the media receiving device can instruct the streaming application that is causing a media content item to be presented to pause presentation of the media content item in response to receiving a pause command. After any actions are performed at 308, process 300 can return to 304 and continue to send status updates. In some implementations, the computing device running the sender application can send a request for a status update, and the receiver application can cause a status update to be sent asynchronously (e.g., not corresponding to a particular period, a status update can be sent whenever a command from among a predetermined subset of commands is received, etc.).

In some implementation, the media receiving device can be configured to support a single concurrent media stream playback. For example, a document object model (DOM) running on the media receiving device can be configured such that only one active video element can be created and/or executed at any given time.

In some implementations, the media receiving device can be configured to present media content that is received in one of a predetermined subset of formats. Any suitable video and/or audio formats can be used, which can include any suitable video and/or audio encoding and/or decoding protocols, code, software, etc. For example, the media receiving device can support a predetermined subset of digital rights management (DRM) formats, such as Widevine, Playready, or any other suitable DRM format. As another example, the media receiving device can support a predetermined subset of video formats, such as VP8, or any other suitable video format. As yet another example, the media receiving device can support a predetermined subset of audio formats, such as MP3, CELT/OPUS, or any other suitable audio format. As still another example, the media receiving device can support a predetermined subset of audio-video formats (e.g., container formats) such as MP4, fragmented MP4 (fMP4), WebM, or any other suitable audio-video format. As a further example, the media receiving device can support a predetermined subset of media streaming formats, such as adaptive bitrate streaming based on any suitable streaming technique(s), or any other suitable media streaming format. In some implementations, audio and/or video received by the media receiving device can be encrypted using any suitable encryption technique(s). For example, the audio and/or video received by the media receiving device can be encrypted using the Common Encryption Scheme (CENC), or any other suitable encryption scheme.

In some implementations, commands sent by the sender application can include:

LOAD

In some implementations, a LOAD command can include fields for "source" which can contain a <content id>, a field for "title", a Boolean (e.g., true/false) field for "autoplay", a "content_info" field, and/or any other suitable field. This command can be used to load new content into the media player. The <content id> can contain an identity of the media to be loaded, which can have any suitable format. For example, <content id> can include a uniform resource identifier (URI), a uniform resource locator (URL), a uniform resource name (URN), an IP address, and/or any other suitable information for specifying a particular source of content and/or item of content. In some implementations, the <content id> can include identifying information of a source and/or identifying information of a media content item available from the source. The format of this field can be defined by the content presentation application, the content streaming application, a media player, and/or using any other suitable technique(s).

If the autoplay field is specified as "true" in LOAD, the content streaming application can begin playing the content when it is loaded. In some implementations, even if autoplay is not specified, the media streaming application can be configured to begin playback immediately. If playback is started, a player state in a status message can be set to "PLAYING," otherwise it can be set to "STOPPED."

The title field can optionally provide a user readable descriptive string for the content being loaded. If provided, the string can be used by the content streaming application as an initial value for the title field of each STATUS object sent from the content streaming application and/or receiver application. Whether or not the title is provided in the LOAD message, the content streaming application can modify the title field at any point based on the implementation of the content streaming application.

The content_info field can contain a JSON object which can give more in-depth information about the content being loaded, e.g. an identification of a TV service, an episode number, etc. If provided, the content_info object can be used as the initial value of the content_info field of each STATUS message (described below). The content streaming application and/or receiver application can modify the content_info at any point, based on, for example, metadata received with a media content item to be presented.

PLAY

In some implementations, a PLAY command can cause playback of the content that was loaded with the load call to be started and/or can change the playback position of currently loaded content. The PLAY command can include a position field, which can be given in seconds and can specify a position in the current content from which to start playback. If a position is not specified, playback can be continued from the current position. If a position that is provided is outside the range of valid positions of the current content, then the content streaming application can determine a valid position as close to the requested position as possible. In some implementations, when a PLAY command is received, a STATUS message can be sent to paired computing devices by the receiver application.

STOP

In some implementations, a STOP command can cause playback of the content to be halted. In some implementations, when a STOP command is received, a STATUS message can be sent to paired computing devices by the receiver application.

VOLUME

In some implementations, a VOLUME message can cause a volume output by the media receiving device (e.g., media receiving device 102) to be adjusted, and/or can cause a command to be issued to a media playback device connected to the media streaming device to change the volume output by the media playback device. A VOLUME message can include a field for a volume to be set. Such a field can be given as a number in a predetermined range, such as 0.0 to 1.0, where each decimal value can correspond to a particular volume. Additionally, in some implementations, a VOLUME message can include a muted field for specifying that the volume is to be muted or unmuted (e.g., based on a current state of the volume). In some implementations, the muted field can be a Boolean flag that if true can cause the volume to be muted if not currently muted, and unmuted if currently muted, and if false can cause no action to be taken with regard to a current mute status.

STATUS

A STATUS message can be sent from the content streaming application and/or the receiver application running on the media receiving application to the sender application and/or the content presentation application running on a paired computing device. This status message can contain status information related to the status of the content streaming application and/or content currently being presented by the content streaming application. Such status information can include a status object.

In some implementations, a status object can include fields for "event_sequence", "state", "active_input", "content_id", "title", "time_progress", "current_time", "duration", "volume", "content_info", "identity", "error" and any other suitable fields.

In some implementations, "event_sequence" can include a sequence number that can be used to identify a relative position of status events received in response to operations (e.g., LOAD, PLAY, etc.), and those received from unsolicited status updates (e.g., periodic updates). When a status event is received in response to an operation, any status event received with a sequence number less than that of the response can be ignored. Additionally, player status messages can be delivered on a separate channel than a channel used to send and/or receive commands. Thus event_sequence can become out of order relative to commands.

In some implementations, "state" can include a current state of the content and/or content streaming application. In some implementations, this can be represented by an integer from zero to two, such that: 0 corresponds to IDLE, 1 corresponds to STOPPED, and 2 corresponds to PLAYING. In some implementations, if "state" corresponds to IDLE, all fields except "sequence_number" and "error" can be ignored.

In some implementations, "active_input" can be a Boolean (e.g., true/false) field for indicating whether content that is being output by the device executing the content streaming application is being presented by a display coupled to the device executing the content streaming application. For example, "active_input" can indicate whether an HDMI input port of a television to which the device executing the content streaming application is coupled is the currently selected input of the television.

In some implementations, "content_id" can include a service-specific identifier of the content currently loaded by the content streaming application, which can be a free form string and can be specific to the content streaming application.

In some implementations, "title" can include a descriptive title of the content currently loaded by the content streaming application. In some implementations, the content streaming application can independently retrieve title information based on "content_id" or "title" given in a LOAD message.

In some implementations, "time_progress" can include an indication of whether the media time of the currently loaded content is progressing. In some implementations, if the value of "time_progress" is false, the computing device running the sender application can be instructed to stop extrapolating the media time. In some implementations, "time_progress" can be independent of "state" as the media time can stop in any state (e.g., due to an error, due to buffering, etc.).

In some implementations, "current_time" can include a current position of the content streaming application with respect to a beginning of the content, which can be given in seconds. If the content is live stream content, "current_time" can represent the time in seconds from the beginning of the live stream.

In some implementations, "duration" can include a representation of a duration of the currently playing content, which can be given in seconds. If the content is a live stream then this field can be set to null.

In some implementations, "volume" can include a current volume level, which can be indicated, for example, by a value between 0.0 and 1.0.

In some implementations, "content_info" can include a service specific object which can provide in-depth information about the current content. In some implementations, an initial value of "content_info" can be provided by the sender application in a LOAD message. In some implementations, the content streaming application can modify the content of "content_info" to provide information obtained by the content streaming application.

In some implementations, "identity" can include an automatically identified authentication token. This can be used when communication with external systems, such as a service provider content delivery network, a digital rights management server, and/or any other suitable outside system is performed. The authentication token can be used to identify the media receiving device running the receiver application when communicating with outside systems rather than an operating system identification or device identification token, which can, for example, enhance a privacy and security of the digital receiving device.

In some implementations, "error" can include a last error encountered by the media receiving device. If no error have been encountered, "error" can be set to null. Additionally, "error" can include an "Error Domain" that can be used to provide errors corresponding to individual applications, such as the receiver application, a content streaming application, etc.

In some implementations, multiple computing devices 112 can be used to send content to a common media playback device using the same or different content presentation applications. In such an implementation, media receiving device 102 can be configured to interrupt content that is currently being presented, add newly sent content to a queue to be presented after presentation of the content that is currently being presented, return a message indicating that display of the content has been inhibited, or any other suitable technique(s) for determining which content to present. In some implementations, settings of a content streaming application running on media receiving device 102 can determine whether to interrupt the currently presented content, add the new content item to a queue, refuse to accept the new content item, or any other technique(s) for determining which content to present.

Figure 10:
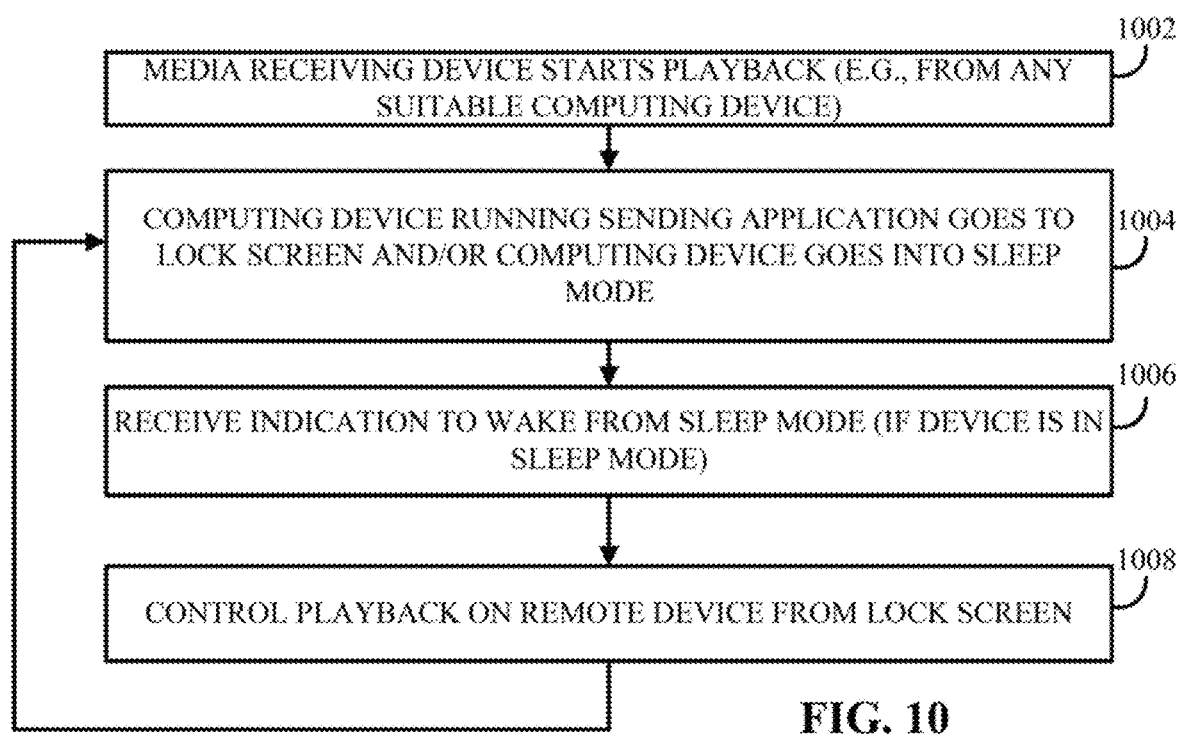
FIG. 10 shows an example of a process for generating commands to be sent to a media receiving device from a lock screen of a computing device in accordance with some implementations of the disclosed subject matter.

FIG. 10 shows an example 1000 of a process for generating commands to be sent to a media receiving device from a lock screen of a computing device running the sender application in accordance with some implementations. At 1002, a media receiving device (e.g., media receiving device 102) can cause content to be presented by starting playback of the content in response to a suitable command from a computing device (e.g., computing device 112).

At 1004, computing device 112 running the sending application can go to a lock screen of the computing device, which can be a screen where a user has to perform an action to "unlock" the computing device prior to accessing some of the features of the computing device. Additionally or alternatively, computing device 112 can go into a "sleep mode" where the computing device can enter into a low power state (e.g., by turning off a display). In some implementations, a computing device can wake from a sleep mode in response to certain events such as receiving a message (e.g., a phone call, a text message, etc.), a particular user input (e.g., a button press on a particular button, a particular movement of the computing device by the user, etc.), and/or any other suitable event.

At 1006, if computing device 112 is in a sleep mode, computing device 106 can receive an indication to wake from sleep mode, as described above.

At 1008, computing device 112 can receive user inputs and the sender application can generate commands to send to media receiving device 102 in response to user inputs.

In some implementations, a second computing device that is not the same as a computing device that caused media content to be presented using a media receiving device can be coupled to the media receiving device and can control presentation of content on the media receiving device. For example, a second computing device can be coupled to a media receiving device that is being used to present content on a media playback device by selecting an icon for pairing with a media receiving device. A particular device can be chosen, and if the second computing device meets specified criterion (e.g., is on the same network, is allowed to be coupled to the media receiving device, the media receiving device is configured to accept control from multiple computing devices, etc.), the second computing device can be coupled and can control presentation of media content on the media receiving device.

In some implementations, a second computing device coupled to the media receiving device can be used to control certain properties of the presentation of the media content, for example, from a lock screen. Additionally, a second computing device that does not have the particular content presentation application used to present the content item can nevertheless be used to control aspects of the presentation of the content item, such as play/pause, volume, seek, etc., but may be inhibited from discovering and/or browsing for additional media content items.

Figure 11A:
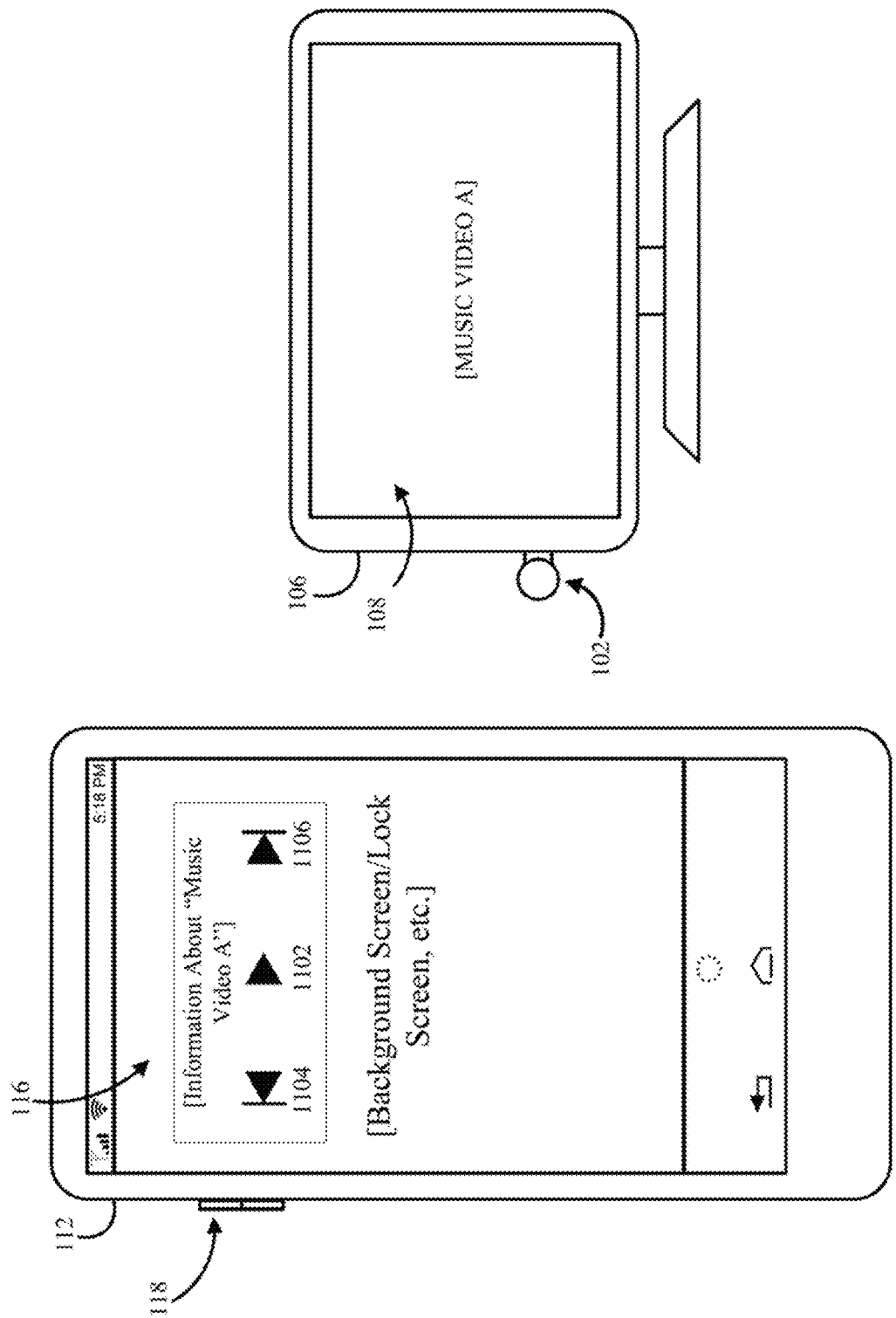
FIGS. 11A-11B show examples of a lock screen user interface for controlling a media receiving device in accordance with some implementations.

FIG. 11A shows an example of a lock screen user interface in accordance with some implementations. In the example shown in FIG. 11A computing device 112 has caused media receiving device 102 to present a media content item to be presented on display 108 of media playback device 106. In some implementations, in a lock screen of computing device 112 running the sending application, information can be presented to the user regarding identification of media content being presented, which can include title information, episode information, etc. The lock screen can also include controls 1102-1106 for controlling playback of the media content item on media playback device 106. For example, the lock screen can contain a play icon 1102 which can be used to control whether to play or pause (or stop) presentation of the media content item, a seek back or previous track icon 1104 and a seek forward or next track icon 1106 which can be used to control such behavior. In some implementations, if computing device 112 detects a user input to one of controls 1102-1106, the sender application can formulate a corresponding command which can be sent over the channel established between computing device 112 and media receiving device 102. Media receiving device 102 can receive the command using the receiver application and the content streaming application that is causing content to be presented can control presentation of the content in response to the received command.

In some implementations, the lock screen can include other user interface items and/or information, such as a scrubber (e.g., a bar indicating a progress time of the media content) which can be used to play the media content from a particular location, a preview function which can present a user with a screen shot of the content at a time indicated by user selection of a particular time using the scrubber, an identification of the media receiving device that is being used to present the content identified by the title presented on the lock screen, and/or any other suitable information or interface items.

Figure 11B:
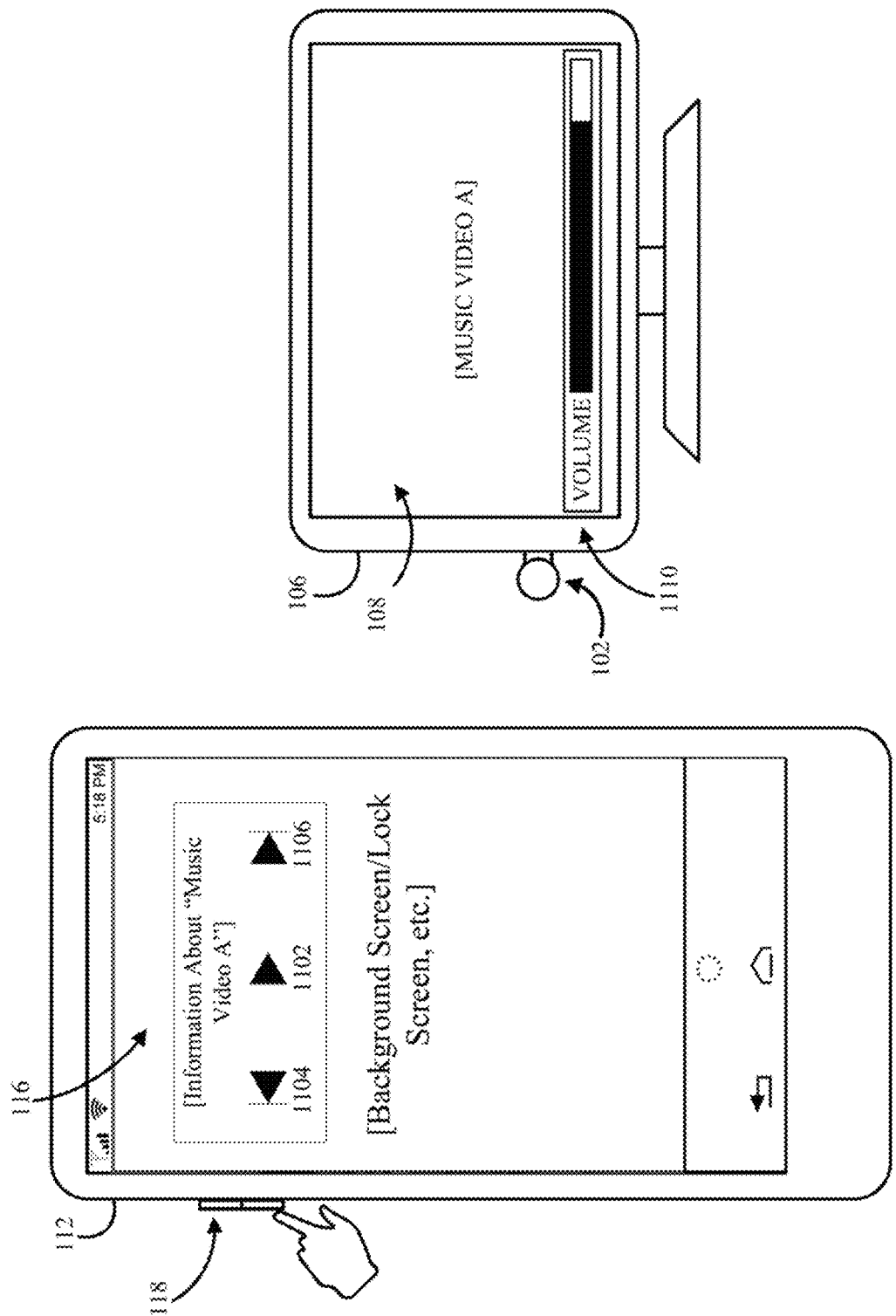

FIG. 11B shows an example of control of volume from a lock screen of a computing device in accordance with some implementations of the disclosed subject matter. In the example shown in FIG. 11B, computing device 112 in a lock screen can detect activation of a volume control 118, for example in response to a user pressing volume control 118. In some implementations, in response to computing device 112 detecting activation of volume control 118 in a lock screen during presentation of media content using media receiving device 102, the sender application can send a command to change the volume to media receiving device as a VOLUME command. The specified volume can change a predetermined amount for each activation of volume control 118 (e.g., volume can be changed by 0.1 for each press). In some implementations, media receiving device 102 can cause an output volume to be changed in response to the receiver application receiving the VOLUME command, and can cause a current volume 510 to be presented on display 108 of media playback device 106.

Figure 12:
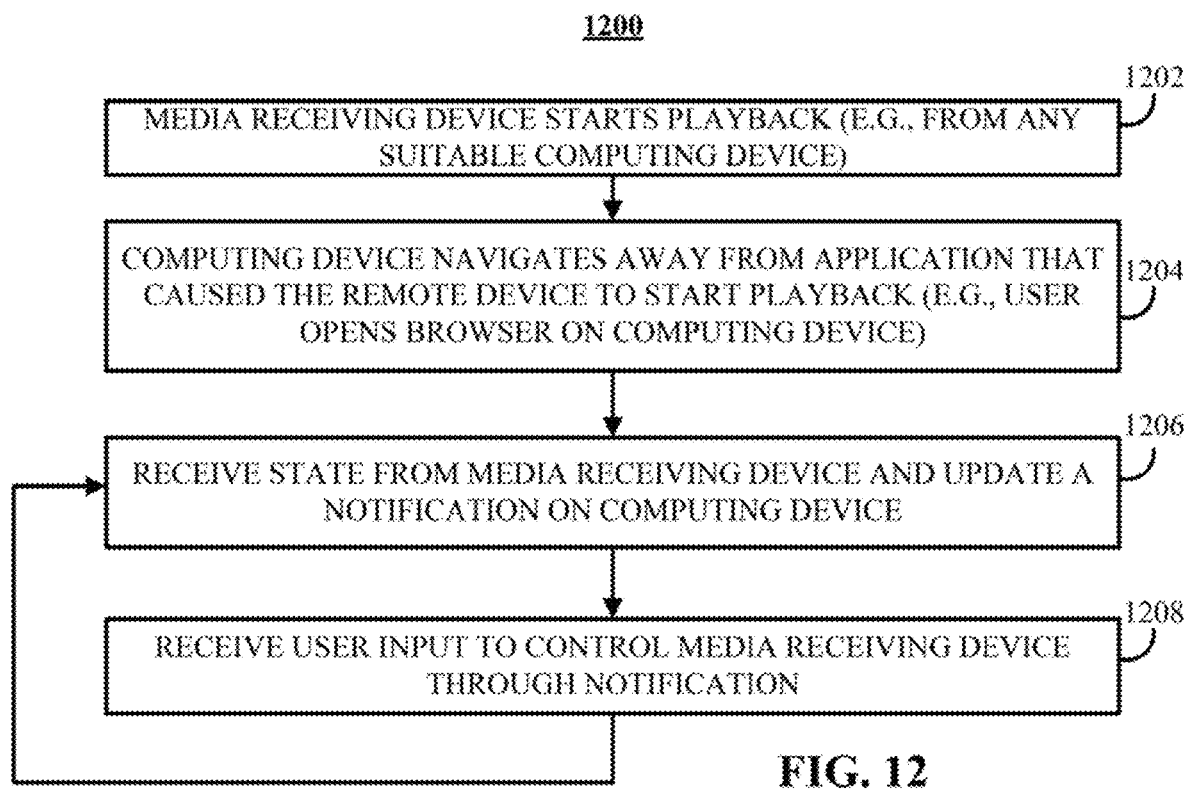
FIG. 12 shows an example of a process for controlling presentation of a media content item from a notification provided on a computing device in accordance with some implementations of the disclosed subject matter.

FIG. 12 shows an example 1200 of a process for controlling presentation of a media content item from a notification provided on a computing device in accordance with some implementations. At 1202, a media receiving device (e.g., media receiving device 102) can cause content to be presented by starting playback of the content in response to a suitable command from a computing device (e.g., computing device 112).

At 1204, computing device 112 that caused the content to be presented can navigate away from the content presentation application that was used to initiate presentation of the content. For example, a Web browser application may be opened by computing device 112 in response to a user instructing computing device 112 to open the Web browser application. As another example, the content presentation application can be minimized or put into a background mode in response to a user navigating to a home screen of computing device 112.

At 1206, the sender application running on computing device 112 can receive a state of content being presented using media receiving device 102. In response to receiving the status of the content, the sender application and/or the content presentation application which can be running, for example, in a background state, can create and/or update a notification related to the state of the content. In some implementations, computing device 112 can place such a notification in a notification center or notification page which can be accessed by receiving a predetermined input.

At 1208, computing device 112 can receive an input to control presentation of the content through the notification that was created and/or updated at 1206. For example, computing device can open a notification page in response to receiving the predetermined input and can receive further input corresponding to a particular command. More particularly, an input can be received that can correspond to a pause command, and the sender application can generate a pause command in response to receiving such an input at the notification. As another example, an input can be received that can correspond to an instruction to open the content presentation application.

FIGS. 13A-13F show an example of using the mechanisms described herein for presenting content used with computing device 112, which can include at least a portion of each of process 800 and process 1000 in accordance with some implementations of the disclosed subject matter.

FIG. 13A shows an example of computing device 112 being used to present a media content item using display 116. In the example shown in FIG. 13A, the media content item can be an episode of a television series being presented using a content presentation application that allows a user to access a service that facilitates streaming of movies and television shows for playback on various devices. A user interface of the content presentation application can include an icon 1302 that causes a sender application and/or the content presentation application running on computing device 112 to initiate mechanisms for causing the content being presented on display 116 to be presented using a media receiving device, such as media receiving device 102. In some implementations, if an input corresponding to media receiving device 102 (e.g., the HDMI port that media receiving device is plugged into) is selected on media playback device 106 while a content item is not being presented by media receiving device 102, a default screen can be presented by media receiving device 102.

Figure 13B:
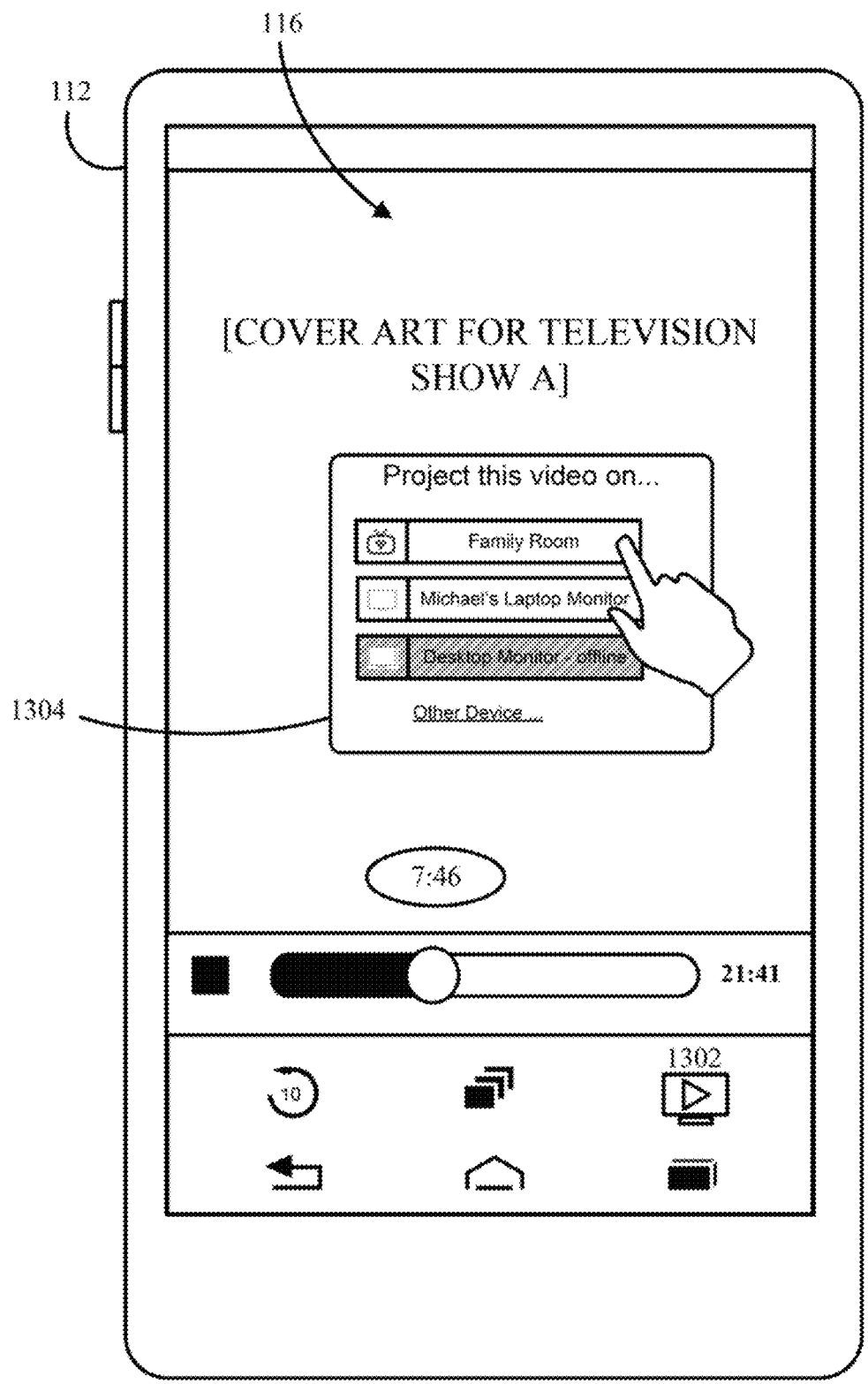

FIG. 13B shows an example of a user interface that can be presented by the sender application in response to computing device 112 receiving an input corresponding to a selection of icon 1302. In the example shown in FIG. 13B, the sender application can present a list 1304 of media receiver devices which can cause the selected media content item (e.g., the television show being presented on display 116 in FIG. 13A) to be presented. In some implementations, when list 1304 is presented, playback of the media content item can be paused or otherwise inhibited pending a user selection. Alternatively, list 1304 can be presented during playback of the media content item by computing device 112.

FIG. 13C shows an example of the media content item being presented by media receiving device 102 on display 108 of media playback device 106, while the content presentation application is active on computing deice 112. In some implementations, information related to the media content can be presented on computing device 112 while the content it being presented using media receiving device 102.

FIG. 13D shows an example of the media content item being presented by media receiving device 102 on display 108 of media playback device 106 while computing device 112 is at a home screen. In some implementations, a user can perform a predetermined action, such as a swipe from a top bezel of a touchscreen of computing device 112 to navigate to a notification screen.

Figure 13E:
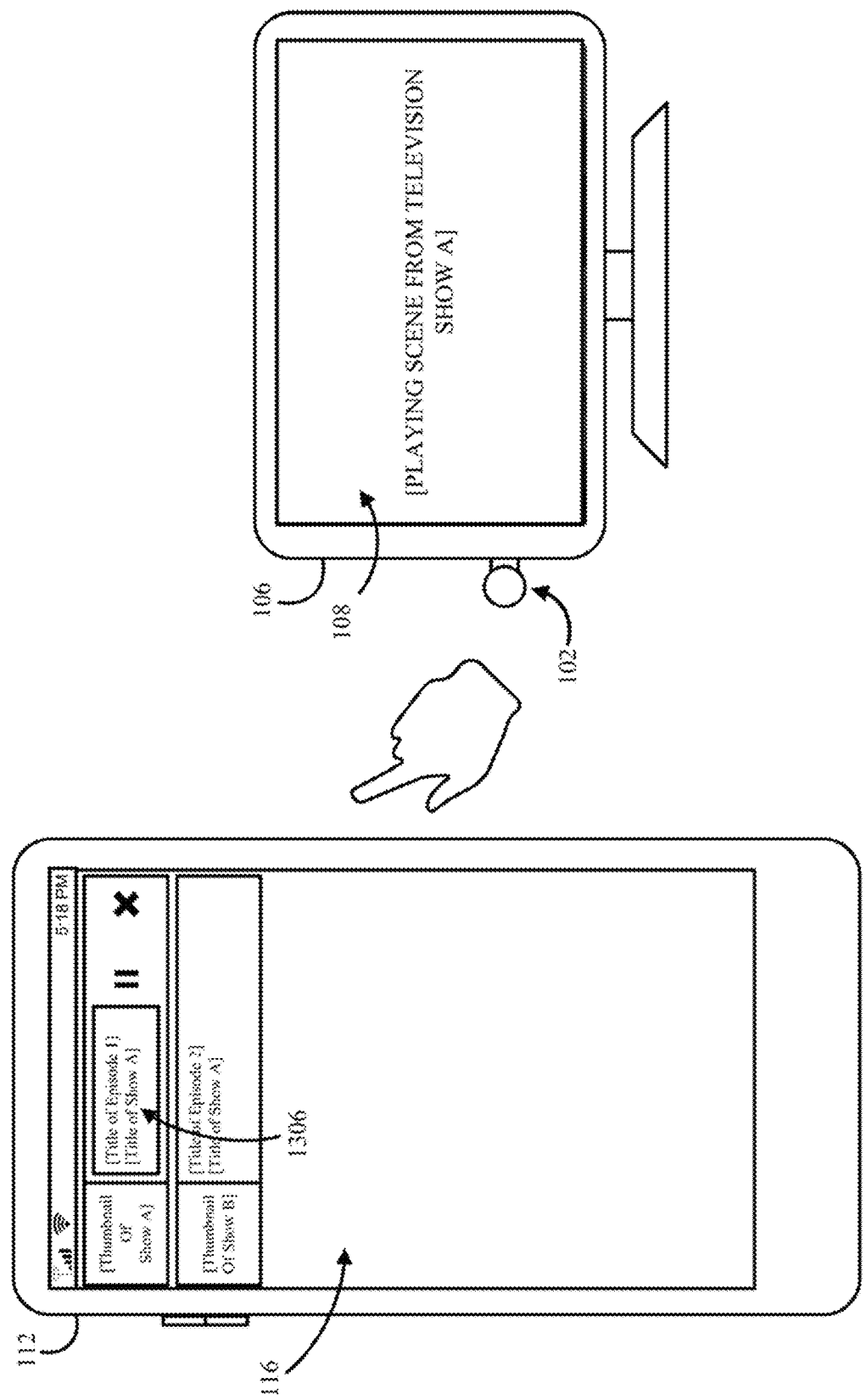

FIG. 13E shows an example of the media content item being presented by media receiving device 102 on display 108 of media playback device 106 while computing device 112 is at a notification screen. As described above in connection with FIG. 12, a notification 1306 can be created that corresponds to the media content item being presented using media receiving device 102, and notification 1306 can be used to control presentation of the media content by media presentation device 102, by for example, receiving an indication that a pause icon has been selected.

FIG. 13F shows an example in which a user is selecting an icon corresponding to the media content being displayed. Selection of such an icon can cause computing device 112 to navigate to the content presentation application, for example as shown in FIG. 13C.

In some implementations, information such as a show title, episode title, cover art, etc. can be displayed in such a notification as shown in, for example, FIGS. 13E and 13F.

FIGS. 14A-14E show an example of using the mechanisms described herein for presenting content used with a computing device running a browser that includes the sender application, which includes at least a portion of each of process 800 and process 1000 in accordance with some implementations of the disclosed subject matter.

Figure 14A:
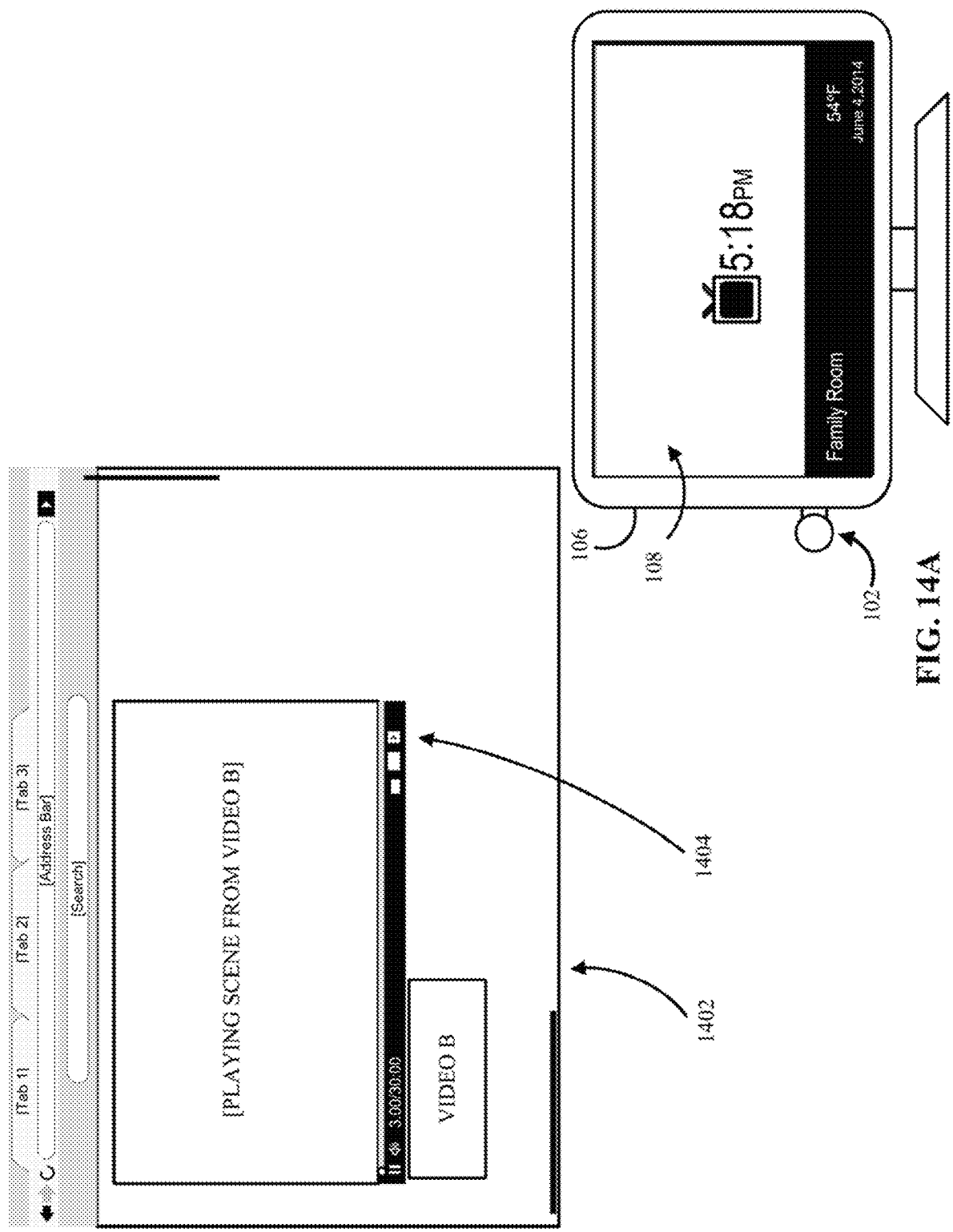
FIGS. 14A-14E show an example of using the mechanisms described herein for presenting content used with a computing device running a browser in accordance with some implementations of the disclosed subject matter.

FIG. 14A shows an example of a browser 1402 being used to present a media content item. In the example shown in FIG. 14A, the media content item can be a video available to users of a video sharing service presented using a Web page of the video sharing service that allows a user to access videos made available by the video sharing service. A user interface of the Web page can include an icon 1404 that causes a sender application and/or browser 1402 to initiate mechanisms for causing the content being presented in the Web page to be presented using a media receiving device, such as media receiving device 102. In some implementations, if an input corresponding to media receiving device 102 (e.g., the HDMI port that media receiving device is plugged into) is selected on media playback device 106 while a content item is not being presented by media receiving device 102, a default screen can be presented by media receiving device 102, as shown in FIG. 14A.

Figure 14B:
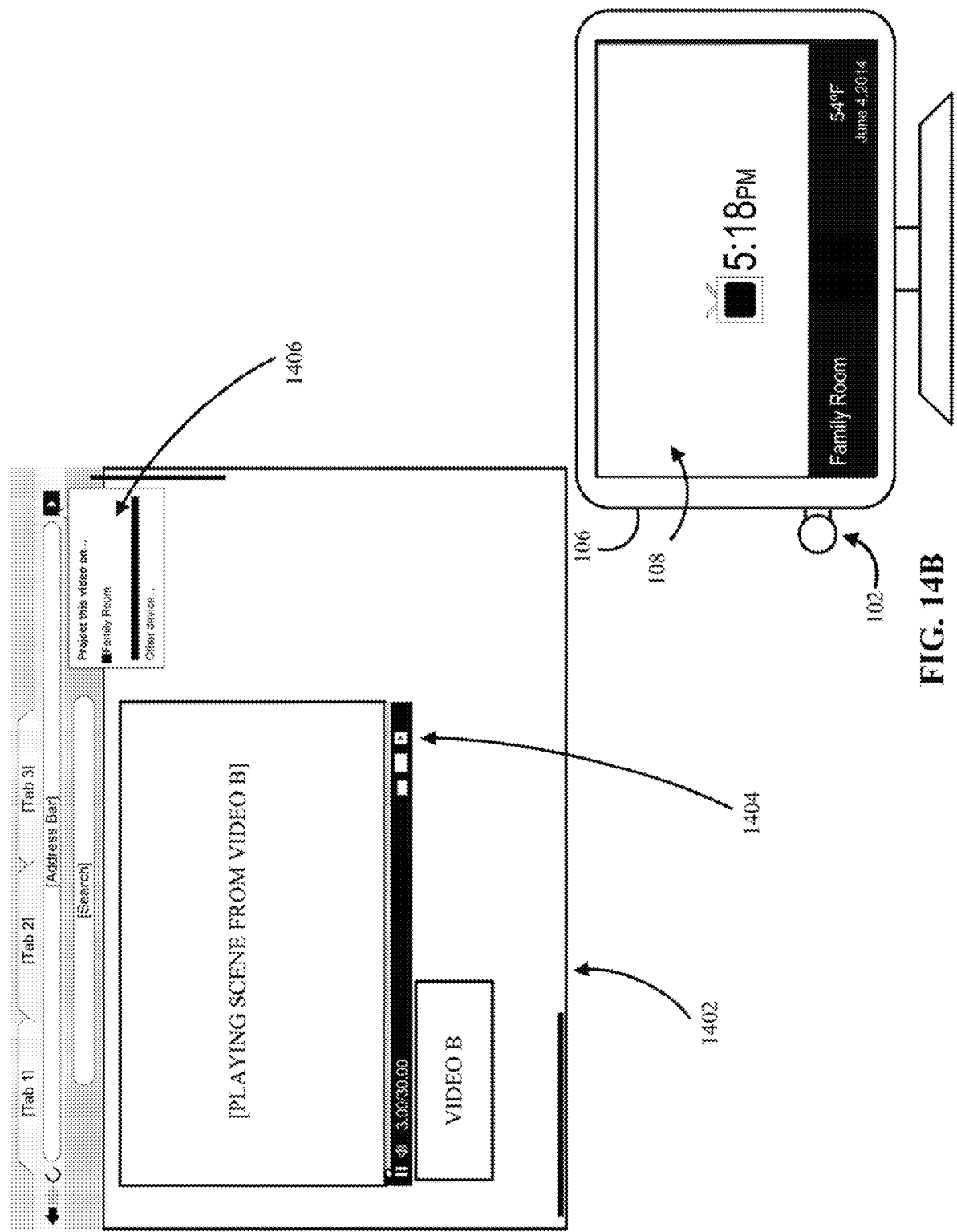
Figure 14C:
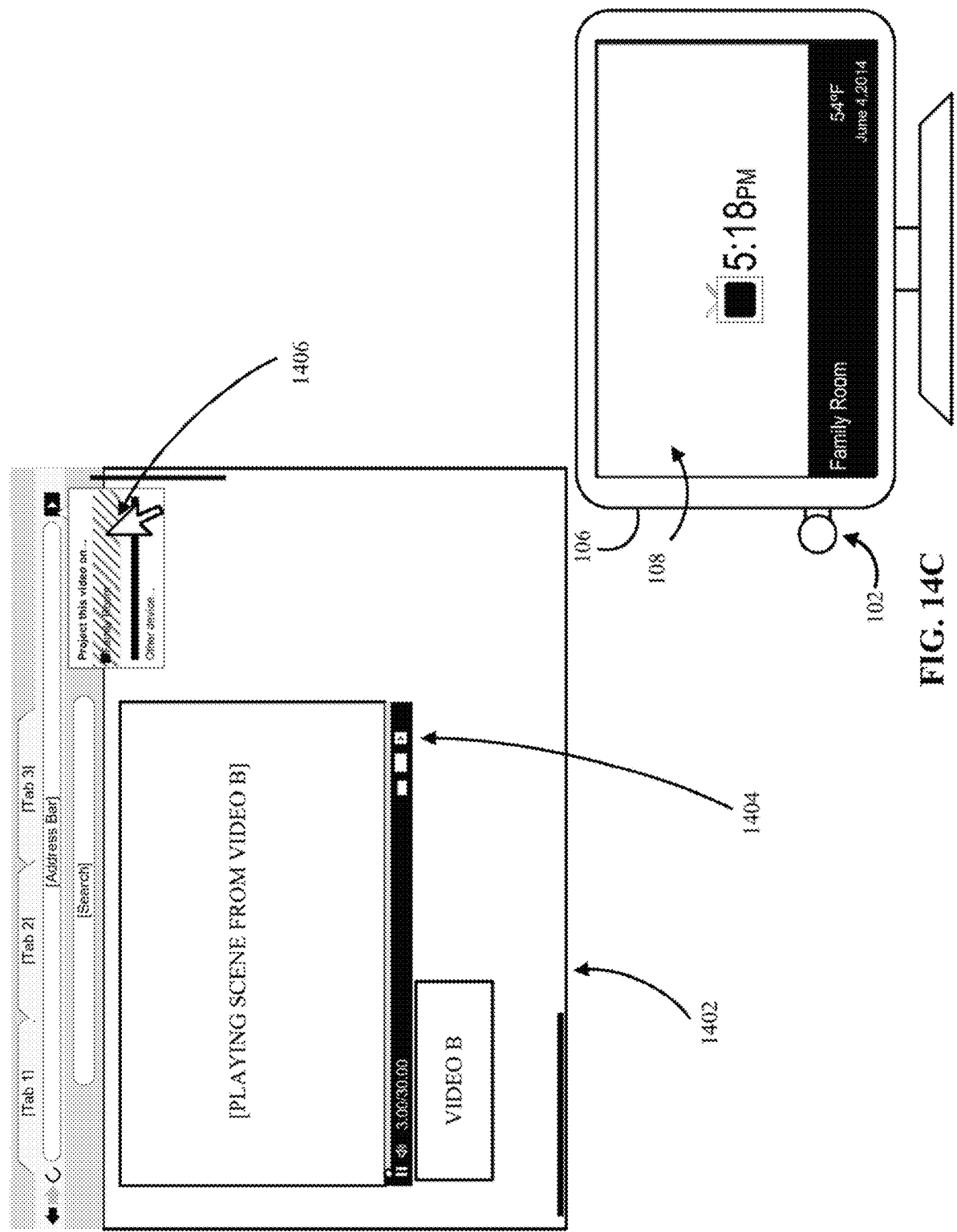

FIG. 14B shows an example of browser 1402 after a selection of icon 1404 is received, where a list 1406 of media receiver devices which can cause the selected media content item (e.g., the video being played in FIG. 14B) to be presented. Additionally or alternatively, in some implementations, list 1406 can be presented as a drop-down list from icon 1404 after selection of icon 1404, and/or list 1406 can be presented as a drop-down from the title bar (e.g., as shown in FIG. 14B) in response to selection of the icon in the title bar. In some implementations, FIG. 14C shows a cursor selecting a media receiving device in list 1406 that corresponds to media receiving device 102 connected to media playback device 106.

Figure 14D:
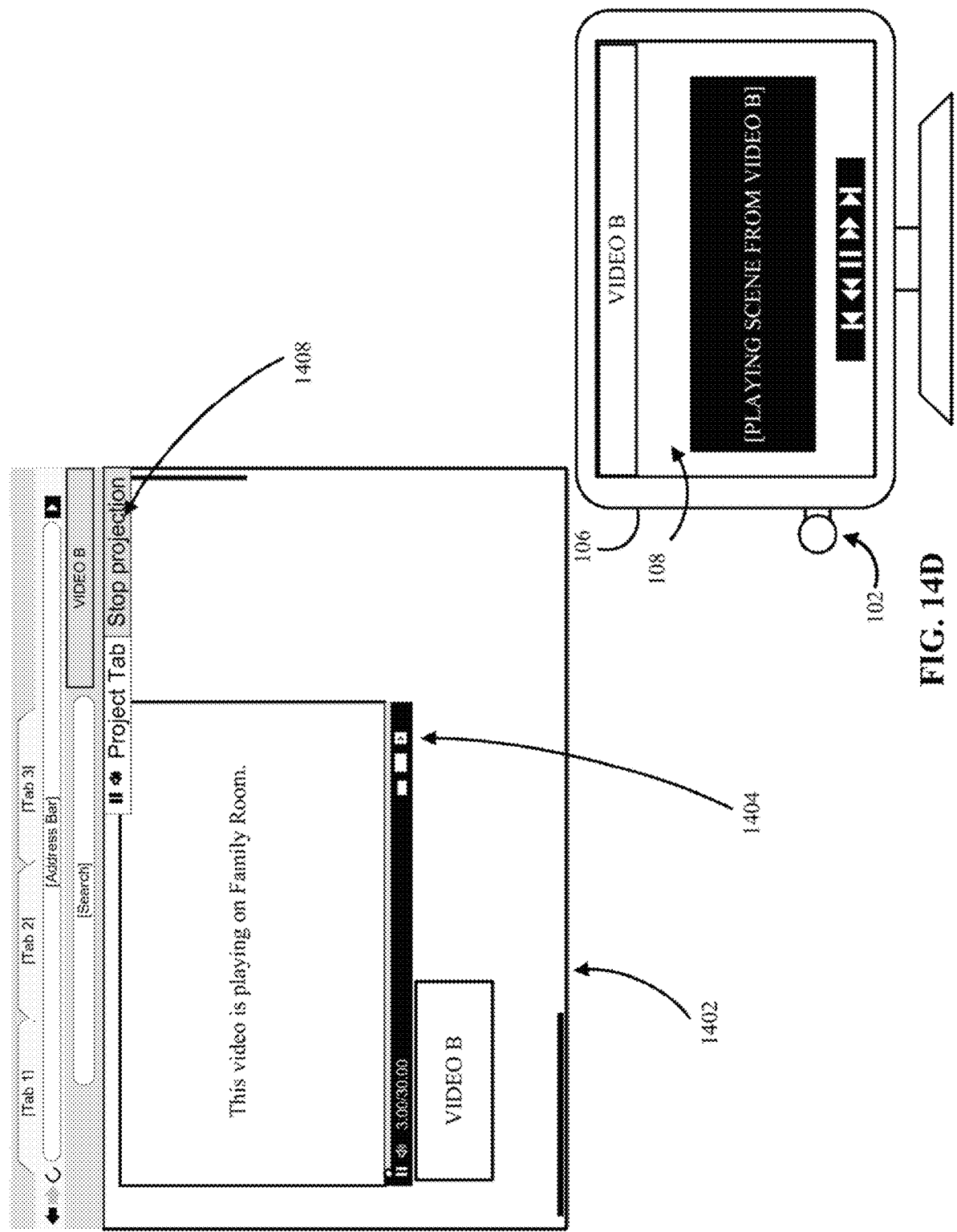

FIG. 14D shows an example of the video that was being presented in browser 1402 being presented by media receiving device 102 on display 108 of media playback device 106. In some implementations, when the media content item is being presented by media playback device 102 a message indicating such can be presented in place of the video in browser 1402. Additionally, controls 1408 for controlling presentation by media receiving device 102 can be presented to a user by browser 1402. In some implementations, when a media content item is initially presented by a media receiving application, e.g., on display 108, information identifying the media content item such as a title, etc., can be presented as an overlay or the like.

Figure 14E:
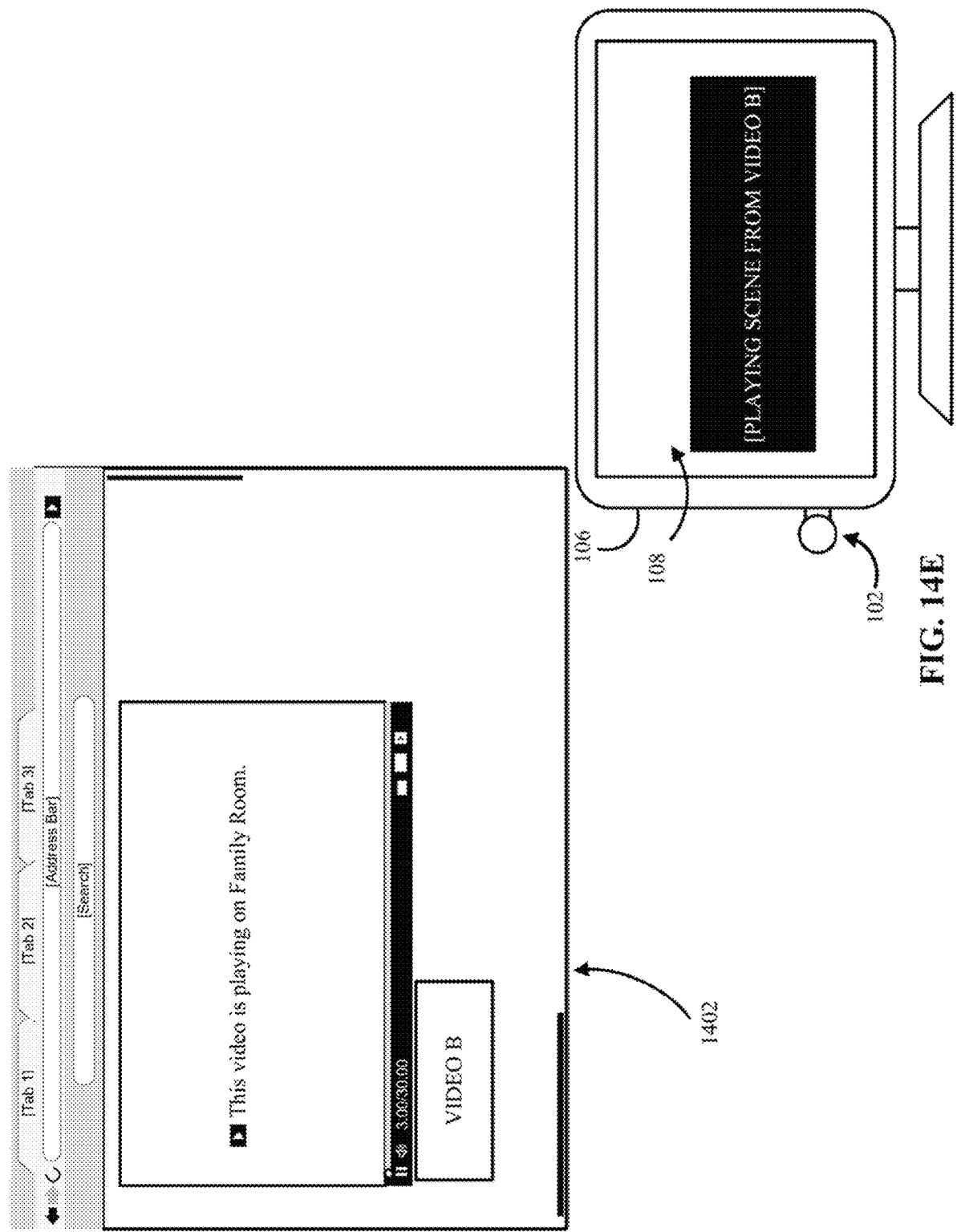

FIG. 14E shows an example in which the video that was being presented on browser 1402 is being presented in a full screen mode on display 108.

In some implementations, the mechanisms described herein including the sender application, the receiver application, the content presentation application, and/or the content streaming application can include server-side software, server-side hardware, client-side software, client-side hardware, or any suitable combination thereof. For example, processes described above in connection with FIGS. 4, 5, 8-10 and 12 can encompass a computer program written in a programming language recognizable by hardware processor 302, hardware processor 312, and/or hardware processor 322 (e.g., a program written in a programming language, such as, Java, C, Objective-C, C++, C#, Javascript, Visual Basic, or any other suitable approaches). As another example, the sender application, the receiver application, the content presentation application and/or the content streaming application can encompass code corresponding to one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches).

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 4, 5, 8-10 and 12 can be executed or performed in any order or sequence not limited to the order and sequence shown and described in the figures. Also, some of the above steps of the processes of FIGS. 4, 5, 8-10 and 12 can be executed or performed substantially simultaneously where appropriate or in parallel to reduce latency and processing times.

It should also be noted that, as used herein, the term mechanism can encompass hardware, software, firmware, or any suitable combination thereof.

Accordingly, systems, methods, and media for presenting media content that was advertised on a second screen device using a primary screen device are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting content to a user, the method comprising:
    receiving, using a hardware processor at a server, an advertisement request from a computing device via a non-local network;
    receiving, using the hardware processor, association information indicating that the computing device is configured to control a media presentation device over a local wireless area network separate from the non-local network, wherein:
        the media presentation device is connected to a television via a high-definition multimedia interface (HDMI) connection and is capable of receiving media content from a remote source and causing the received media content to be output for presentation to the television via the HDMI connection, wherein:
            the computing device is associated with a user account; and
            the media presentation device is separate from the television and the computing device;
    in response to the advertisement request, selecting, using the hardware processor, an advertisement for media content based on the association information indicating that the computing device is associated with the media presentation device over the wireless local area network; and
    causing, using the hardware processor, the advertisement to be presented by computing device, wherein the advertisement is associated with instructions that, in response to the computing device receiving input indicating interaction with the advertisement, cause the computing device to instruct the media presentation device to present the media content.

2. The method of claim 1, further comprising receiving, using the hardware processor, user account information associated with the user account, wherein the advertisement is selected based on the user account information indicating that the user being presented with the advertisement is not currently subscribed to a service.

3. The method of claim 2, wherein user account information includes one or more services that are subscribed to by the user account.

4. The method of claim 3, wherein selecting the advertisement comprises selecting the advertisement associated with the one or more services that are subscribed to by the user account.

5. The method of claim 3, wherein selecting the advertisement comprises selecting the advertisement from a plurality of advertisements associated with a service related to the one or more services that are subscribed to by the user account.

6. The method of claim 2, further comprising:
    determining, using the hardware processor, whether an indicator of subscription status of the user account to the service is to be presented in connection with the selected advertisement based on the user account information, wherein the determining whether the indicator of subscription status is to be presented in connection with the selected advertisement includes determining that the user of the user account is likely to subscribe to the service;
    causing, using the hardware processor, the advertisement to be presented by computing device, wherein the advertisement is associated with instructions that, in response to the computing device receiving input indicating interaction with the advertisement, cause the computing device to instruct the media presentation device to present the media content and the indicator of subscription status;
    receiving, using the hardware processor, input indicating that the indicator of subscription status has been selected; and
    in response to receiving the input indicating that the indicator of subscription status has been selected:
        causing, using the hardware processor, an application associated with the service to be installed on at least one of the computing device and the media presentation device; and
        causing, using the hardware processor, the media presentation device to switch an input corresponding to the media presentation device, execute the application, and initiate presentation of the media content on the television via the media presentation device.

7. The method of claim 6, wherein detecting interaction with the advertisement comprises detecting that an area corresponding to the advertisement has been selected using the computing device.

8. The method of claim 6, wherein detecting interaction with the advertisement comprises detecting that a cursor of the computing device has been in an area corresponding to the advertisement for at least a threshold amount of time.

9. The method of claim 6, wherein the indicator of subscription status includes a prompt to subscribe to the service and wherein the method further comprises:
    receiving subscription information in the prompt to subscribe to the service; and
    enabling the media presentation device to playback media content provided by the service through the application executing on the media presentation device.

10. The method of claim 1, further comprising receiving status information of the media presentation device, and wherein the advertisement is selected based at least in part on the status information.

11. A system for presenting content to a user, the system comprising:
    a hardware processor that is configured to:
        receive an advertisement request from a computing device;
        receive association information indicating that the computing device is associated with a media presentation device over a wireless local area network, wherein:
            the media presentation device is connected to a television via a high-definition multimedia interface (HDMI) connection and is capable of receiving media content from a remote source and causing the received media content to be output for presentation to the television via the HDMI connection;

the computing device is associated with a user account; and the media presentation device is separate from the television and the computing device;

in response to the advertisement request, select an advertisement for media content based on the association information indicating that the computing device is associated with the media presentation device over the wireless local area network; and cause the advertisement to be presented by computing device, wherein the advertisement is associated with instructions that, in response to the computing device receiving input indicating interaction with the advertisement, cause the computing device to instruct the media presentation device to present the media content.

12. The system of claim 11, wherein the hardware processor is further configured to receive user account information associated with the user account, wherein the advertisement is selected based on the user account information indicating that the user being presented with the advertisement is not currently subscribed to a service.

13. The system of claim 12, wherein user account information includes one or more services that are subscribed to by the user account.

14. The system of claim 13, wherein selecting the advertisement comprises selecting the advertisement associated with the one or more services that are subscribed to by the user account.

15. The system of claim 13, wherein selecting the advertisement comprises selecting the advertisement from a plurality of advertisements associated with a service related to the one or more services that are subscribed to by the user account.

16. The system of claim 12, wherein the hardware processor is further configured to:

determine whether an indicator of subscription status of the user account to the service is to be presented in connection with the selected advertisement based on the user account information, wherein the determining whether the indicator of subscription status is to be presented in connection with the selected advertisement includes determining that the user of the user account is likely to subscribe to the service;

cause the advertisement to be presented by computing device, wherein the advertisement is associated with instructions that, in response to the computing device receiving input indicating interaction with the advertisement, cause the computing device to instruct the media presentation device to present the media content and the indicator of subscription status;

receive input indicating that the indicator of subscription status has been selected; and in response to receiving the input indicating that the indicator of subscription status has been selected:

cause an application associated with the service to be installed on at least one of the computing device and the media presentation device; and cause the media presentation device to switch an input corresponding to the media presentation device, execute the application, and initiate presentation of the media content on the television via the media presentation device.

17. The system of claim 16, wherein detecting interaction with the advertisement comprises detecting that an area corresponding to the advertisement has been selected using the computing device.

18. The system of claim 16, wherein detecting interaction with the advertisement comprises detecting that a cursor of the computing device has been in an area corresponding to the advertisement for at least a threshold amount of time.

19. The system of claim 16, wherein the indicator of subscription status includes a prompt to subscribe to the service and wherein the hardware processor is further configured to:

receiving subscription information in the prompt to subscribe to the service; and enabling the media presentation device to playback media content provided by the service through the application executing on the media presentation device.

20. The system of claim 11, wherein the hardware processor is further configured to receive status information of the media presentation device, and wherein the advertisement is selected based at least in part on the status information.

21. A non-transitory computer-readable medium containing computer-executable instructions that, when executed by a processor, cause the processor to perform a method for presenting content to a user, the method comprising:

receiving an advertisement request from a computing device;

receiving association information indicating that the computing device is associated with a media presentation device over a wireless local area network, wherein:

the media presentation device is connected to a television via a high-definition multimedia interface (HDMI) connection and is capable of receiving media content from a remote source and causing the received media content to be output for presentation to the television via the HDMI connection;

the computing device is associated with a user account; and the media presentation device is separate from the television and the computing device;

in response to the advertisement request, selecting an advertisement for media content based on the association information indicating that the computing device is associated with the media presentation device over the wireless local area network; and causing the advertisement to be presented by computing device, wherein the advertisement is associated with instructions that, in response to the computing device receiving input indicating interaction with the advertisement, cause the computing device to instruct the media presentation device to present the media content.

* * * * *